US010945151B2

(12) United States Patent
Sun et al.

(10) Patent No.: US 10,945,151 B2
(45) Date of Patent: Mar. 9, 2021

(54) DATA TRANSMISSION RATE CONTROL METHOD AND DEVICE

(71) Applicant: Huawei Technologies Co., Ltd., Shenzhen (CN)

(72) Inventors: Yanliang Sun, Shenzhen (CN); Bin Liu, San Diego, CA (US); Kai Xu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/464,050

(22) PCT Filed: Apr. 26, 2017

(86) PCT No.: PCT/CN2017/082255
§ 371 (c)(1),
(2) Date: May 24, 2019

(87) PCT Pub. No.: WO2018/094966
PCT Pub. Date: May 31, 2018

(65) Prior Publication Data
US 2019/0380059 A1    Dec. 12, 2019

(30) Foreign Application Priority Data

Nov. 24, 2016  (CN) .......................... 201611045614.7
Mar. 28, 2017  (CN) .......................... 201710193324.5

(51) Int. Cl.
*H04W 28/02*     (2009.01)
*H04L 1/00*      (2006.01)
(Continued)

(52) U.S. Cl.
CPC ....... *H04W 28/0231* (2013.01); *H04L 1/0003* (2013.01); *H04W 24/10* (2013.01);
(Continued)

(58) Field of Classification Search
CPC ..................................................... H04L 1/0003
See application file for complete search history.

(56) References Cited

U.S. PATENT DOCUMENTS

2011/0222469 A1* 9/2011 Ali ........................ H04L 1/0003
370/328
2014/0071838 A1   3/2014 Jia et al.
(Continued)

FOREIGN PATENT DOCUMENTS

CN       102045823 A       5/2011
CN       104349443 A       2/2015
(Continued)

OTHER PUBLICATIONS

Machine Translation and Abstract of Chinese Publication No. CN102045823, May 4, 2011, 29 pages.
(Continued)

*Primary Examiner* — Fahmida S Chowdhury
(74) *Attorney, Agent, or Firm* — Conley Rose, P.C.

(57) ABSTRACT

A data transmission rate control terminal device receives beam indication information and scheduling information from a base station. The terminal device determines at least one beam based on a set of N candidate beam pair links (BPLs). The terminal device determines second modulation and coding indication information according to first modulation and coding indication information, and the terminal device transmits data on the at least one beam according to resource indication information and the second modulation and coding indication information.

20 Claims, 20 Drawing Sheets

(51) Int. Cl.
H04W 24/10 (2009.01)
H04W 72/06 (2009.01)
H04W 72/08 (2009.01)
H04W 72/12 (2009.01)

(52) U.S. Cl.
CPC ......... *H04W 72/06* (2013.01); *H04W 72/085* (2013.01); *H04W 72/12* (2013.01); *H04W 28/0278* (2013.01)

(56) References Cited

U.S. PATENT DOCUMENTS

| | | | |
|---|---|---|---|
| 2015/0382268 A1* | 12/2015 | Hampel | H04W 36/0072 455/436 |
| 2016/0119042 A1 | 4/2016 | Niu et al. | |
| 2016/0183195 A1 | 6/2016 | Gao et al. | |
| 2016/0294462 A1 | 10/2016 | Jeong et al. | |
| 2016/0352396 A1* | 12/2016 | Seol | H04B 7/0837 |
| 2016/0373230 A1* | 12/2016 | Morita | H04W 72/042 |
| 2017/0150480 A1* | 5/2017 | Kim | H04W 8/005 |
| 2018/0115389 A1 | 4/2018 | Chen et al. | |
| 2018/0123675 A1 | 5/2018 | Shi et al. | |
| 2019/0104549 A1* | 4/2019 | Deng | H04B 7/0617 |

FOREIGN PATENT DOCUMENTS

| | | |
|---|---|---|
| CN | 104604172 A | 5/2015 |
| CN | 105337701 A | 2/2016 |
| CN | 105556869 A | 5/2016 |
| CN | 105680922 A | 6/2016 |
| CN | 105991231 A | 10/2016 |
| EP | 3014788 A1 | 5/2016 |
| WO | 2012044861 A1 | 4/2012 |
| WO | 2014146301 A1 | 9/2014 |
| WO | 2014210441 A1 | 12/2014 |
| WO | 2015099497 A1 | 7/2015 |
| WO | 2016179804 A1 | 11/2016 |

OTHER PUBLICATIONS

"3rd Generation Partnership Project; Technical Specification Group Radio Access Network; Evolved Universal Terrestrial Radio Access (E-UTRA); Physical channels and modulation (Release 14)," 3GPP TS 36.211, V14.0.0, Part 1, Sep. 2016, 7 pages.

"3rd Generation Partnership Project; Technical Specification Group Radio Access Network; Evolved Universal Terrestrial Radio Access (E-UTRA); Physical channels and modulation (Release 14)," 3GPP TS 36.211, V14.0.0, Part 2, Sep. 2016, 59 pages.

"3rd Generation Partnership Project; Technical Specification Group Radio Access Network; Evolved Universal Terrestrial Radio Access (E-UTRA); Physical channels and modulation (Release 14)," 3GPP TS 36.211, V14.0.0, Part 3, Sep. 2016, 69 pages.

"3rd Generation Partnership Project; Technical Specification Group Radio Access Network; Evolved Universal Terrestrial Radio Access (E-UTRA); Physical channels and modulation (Release 14)," 3GPP TS 36.211, V14.0.0, Part 4, Sep. 2016, 35 pages.

"3rd Generation Partnership Project; Technical Specification Group Radio Access Network; Evolved Universal Terrestrial Radio Access (E-UTRA); Physical layer procedures (Release 14)," 3GPP TS 36.213, V14.0.0, Part 1, Sep. 2016, 7 pages.

"3rd Generation Partnership Project; Technical Specification Group Radio Access Network; Evolved Universal Terrestrial Radio Access (E-UTRA); Physical layer procedures (Release 14)," 3GPP TS 36.213, V14.0.0, Part 2, Sep. 2016, 38 pages.

"3rd Generation Partnership Project; Technical Specification Group Radio Access Network; Evolved Universal Terrestrial Radio Access (E-UTRA); Physical layer procedures (Release 14)," 3GPP TS 36.213, V14.0.0, Part 3, Sep. 2016, 218 pages.

"3rd Generation Partnership Project; Technical Specification Group Radio Access Network; Evolved Universal Terrestrial Radio Access (E-UTRA); Physical layer procedures (Release 14)," 3GPP TS 36.213, V14.0.0, Part 4, Sep. 2016, 81 pages.

"3rd Generation Partnership Project; Technical Specification Group Radio Access Network; Evolved Universal Terrestrial Radio Access (E-UTRA); Physical layer procedures (Release 14)," 3GPP TS 36.213, V14.0.0, Part 5, Sep. 2016, 51 pages.

"3rd Generation Partnership Project; Technical Specification Group Radio Access Network; Evolved Universal Terrestrial Radio Access (E-UTRA); Physical layer procedures (Release 14)," 3GPP TS 36.213, V14.0.0, Part 6, Sep. 2016, 11 pages.

Ericsson, "CSI-RS Design for FD-MIMO" R1-154551, 3GPP TSG-RAN WG1#82, Beijing, China, Aug. 24-28, 2015, 4 pages.

Ericsson, "CSI-RS Design for Class A eFD-MIMO" R1-167633, 3GPP TSG-RAN WG1 #86, Gothenburg, Sweden, Aug. 22-26, 2016, 11 pages.

LG Electronics, "On the impact of UE rotation" R1-1609248, 3GPP TSG RAN WG1 Meeting #86bis, Lisbon, Portugal, Oct. 10-14, 2016, 7 pages.

Ericsson, "Beam management principles" R1-1609754, 3GPP TSG-RAN WG1 #86bis, Lisbon, Portugal, Oct. 10-14, 2016, 5 pages.

Foreign Communication From a Counterpart Application, PCT Application No. PCT/CN2017/082255, English Translation of International Search Report dated Jun. 29, 2017, 2 pages.

Foreign Communication From a Counterpart Application, PCT Application No. PCT/CN2017/082255, English Translation of Written Opinion dated Jun. 29, 2017, 5 pages.

Foreign Communication From a Counterpart Application, European Application No. 17873017.2, Extended European Search Report dated Sep. 20, 2019, 8 pages.

Zhang, B., et al., "A Robust DL MU-MIMO Algorithm and UE Specific SINR Compensation Mechanism in LTE-A," Telecommunication Engineering, vol. 55, No. 9, Sep. 2015, 9 pages.

Samano-Robles, R., "Joint user scheduling, link adaptation and beam-forming for distributed antenna systems," 20th Telecommunications forum TELFOR 2012, Serbia, Belgrade, Nov. 20-22, 2012, 4 pages.

* cited by examiner

DATA TRANSMISSION RATE CONTROL METHOD AND DEVICE

CROSS-REFERENCE TO RELATED APPLICATIONS

This application is a U.S. National Stage of International Patent Application No. PCT/CN2017/082255 filed Apr. 27, 2017, which claims priority to Chinese Patent Application No. 201611045614.7 filed on Nov. 24, 2016 and Chinese Patent Application No. 20171093324.5 filed on Mar. 28, 2017. All of the aforementioned applications are hereby incorporated by reference in their entirties.

TECHNICAL FIELD

Embodiments of the present invention relate to the field of communications technologies, and in particular, to a data transmission rate control method and a device.

BACKGROUND

For 5G, organizations for standardization have started a research project on a New Radio technology (New Radio Access Technology, NR). The NR has a wide frequency band coverage range. To establish a unified radio technology framework between a frequency band sub-6 GHz (0 to 6 GHz) and a frequency band above-6 GHz (6 to 100 GHz), a high frequency band beamforming technology is being researched.

In a high frequency band communication process, a transmission channel of a high frequency band is characterized by high dynamics, vulnerability to blocking, and the like. At present, for data transmission in a high frequency band scenario of the NR, there is no method that can not only ensure quality of service (Quality of Service, QoS) of the data transmission, but also control a data transmission rate.

In the prior art, a data transmission rate control method applied to a Long Term Evolution (Long Term Evolution, LTE) system is provided. Specifically, as shown in FIG. 1, at a physical layer of the LTE system, a terminal device sends a reference signal to a base station, and the base station measures the reference signal to generate channel state information (Channel State Information, CSI); and at an access layer of the LTE system, the terminal device reports buffer status information (Buffer Status Information, BSI) to the base station; the base station determines service requirement information of the terminal device based on the BSI; the base station determines a data transmission channel based on the CSI, and determines a data transmission rate based on the service requirement information of the terminal device; the base station generates scheduling information based on the data transmission channel and the data transmission rate, and sends the scheduling information to the terminal device; and after receiving the scheduling information, the terminal device transmits data on the transmission channel indicated by the scheduling information and at the data transmission rate indicated by the scheduling information.

However, the foregoing data transmission rate control method cannot be applied to the high frequency band scenario of the NR. In the high frequency band scenario of the NR, according to the foregoing data transmission rate control method, in a process in which a terminal device transmits data based on scheduling information, a base station needs to measure a reference signal in real time to obtain CSI, and generate scheduling information based on the CSI. Therefore, overheads for generating the scheduling information are high. In addition, because a transmission channel of a high frequency band is characterized by high dynamics and vulnerability to blocking, a period of sending a reference signal by the terminal device is usually long, thereby causing long latency. Therefore, the CSI generated by the base station based on the reference signal may not be current actual CSI. In other words, the generated CSI cannot reflect a current channel state. Consequently, data cannot be normally transmitted, in other words, QoS of data transmission cannot be ensured.

SUMMARY

This application provides a data transmission rate control method and a device, to reduce overheads for generating scheduling information, and ensure QoS of data transmission.

To achieve the foregoing objective, the following technical solutions are used in this application.

According to a first aspect of this application, a data transmission rate control method is provided, including: receiving, by a terminal device, beam indication information sent by a base station, where the beam indication information includes a set of N candidate beam pair links (Beam Pair Link, BPL), and N≥1; receiving, by the terminal device, scheduling information sent by the base station, where the scheduling information includes resource indication information and first modulation and coding indication information, and the first modulation and coding indication information includes a first modulation and coding parameter (Modulation and Coding Scheme, MCS) and/or a first rank indication (Rank Indication, RI); determining, by the terminal device, at least one beam based on the set of N candidate BPLs; determining, by the terminal device, second modulation and coding indication information according to the first modulation and coding indication information, where the second modulation and coding indication information includes a second MCS and/or a second RI; and transmitting, by the terminal device, data on the at least one beam according to the resource indication information and the second modulation and coding indication information. In this application, the terminal device may transmit data on the determined at least one beam according to the resource indication information and the second modulation and coding indication information. The beam indication information is used to indicate a beam required for data transmission, the resource indication information is determined by the base station based on a data packet size of the data, the resource indication information is used to indicate a data block required for data transmission, and the first modulation and coding indication information is used to indicate a transmission rate and/or bandwidth required for data transmission. Therefore, when the terminal device transmits the data on the at least one beam according to the resource indication information and the second modulation and coding indication information, in other words, when the terminal device transmits the data on the at least one beam and on the data block required for data transmission at a transmission rate and/or bandwidth higher than the transmission rate and/or bandwidth that is required for data transmission and that is indicated by the first modulation and coding indication information, normal data transmission can be ensured, in other words, quality of service (Quality of Service, QoS) of data transmission can be ensured. In addition, in a process of transmitting data based on the scheduling information, the terminal device may adaptively adjust the first modulation and coding indication information according to the first modulation and coding indication information, to be specific, transmit the data according to the second modulation and coding indication information. Therefore, when transmitting the data based on the scheduling information, the terminal device may transmit the data for a plurality of times based on the scheduling information, and the base station is not required to generate corresponding scheduling information each time data is transmitted. Compared with the prior art in which the base station measures a reference signal in real time to obtain CSI and generates scheduling information based on the CSI, this reduces overheads for generating the scheduling information.

With reference to the first aspect, in a possible implementation of this application, the set of N candidate BPLs may include N terminal-side beams. Correspondingly, the method in this application may further include: receiving, by the terminal device, measurement indication information sent by the base station, where the measurement indication information includes uplink measurement results of the N terminal-side beams. Correspondingly, the "determining, by the terminal device, at least one beam based on the set of N candidate BPLs" in the first aspect may include: determining, by the terminal device, the at least one beam from the N terminal-side beams based on the uplink measurement results of the N terminal-side beams. The at least one beam is determined by the terminal device from the N terminal-side beams based on the uplink measurement results of the N terminal-side beams. Therefore, when transmitting the data on the at least one beam, the terminal device may perform flexible switching in the N terminal-side beams based on the uplink measurement results of the N terminal-side beams.

With reference to the first aspect and the foregoing possible implementation, in another possible implementation of this application, when the set of N candidate BPLs includes the N terminal-side beams, the set of N candidate BPLs may specifically include beam sequence numbers of the N terminal-side beams. The base station may determine the N terminal-side beams based on sequence numbers that are of M uplink beam measurement reference signals and that are sent by the terminal device. The set of N candidate BPLs may include the sequence numbers of the N terminal-side beams. The sequence numbers of the M uplink beam measurement reference signals correspond to the beam sequence numbers of the N terminal-side beams, and M≥N≥1.

With reference to the first aspect and the foregoing possible implementations, in another possible implementation of this application, the set of N candidate BPLs may include N base station-side beams. Correspondingly, the method in this application may further include: measuring, by the terminal device, the N base station-side beams to obtain downlink measurement results of the N base station-side beams. Correspondingly, the "determining, by the terminal device, at least one beam based on the set of N candidate BPLs" may include: determining, by the terminal device, the at least one beam from the N base station-side beams based on the downlink measurement results of the N base station-side beams. The at least one beam is determined by the terminal device from the N base station-side beams based on the downlink measurement results of the N base station-side beams. Therefore, when transmitting the data on the at least one beam, the terminal device may perform flexible switching in the N base station-side beams based on the downlink measurement results of the N base station-side beams.

With reference to the first aspect and the foregoing possible implementations, in another possible implementation of this application, when the set of N candidate BPLs includes the N base station-side beams, the set of N candidate BPLs specifically includes beam sequence numbers of the N base station-side beams. The base station may determine the N base station-side beams based on sequence numbers that are of M downlink beam measurement reference signals and that are fed back by the terminal device. The set of N candidate BPLs may include the sequence numbers of the N base station-side beams. The sequence numbers of the M downlink beam measurement reference signals correspond to the beam sequence numbers of the N base station-side beams, and M≥N≥1.

With reference to the first aspect and the foregoing possible implementations, in another possible implementation of this application, after "the transmitting, by the terminal device, data on the at least one beam according to the resource indication information and the second modulation and coding indication information", the method in this application may further include: sending, by the terminal device, the second modulation and coding indication information to the base station, so that the base station decodes the data based on the second modulation and coding indication information. The terminal device may send the second modulation and coding indication information to the base station while sending the data to the base station.

With reference to the first aspect and the foregoing possible implementations, in another possible implementation of this application, the method in this application may further include: receiving, by the terminal device, acknowledgement information or negative acknowledgement information sent by the base station; and adjusting, by the terminal device, the second modulation and coding indication information based on the acknowledgement information or the negative acknowledgement information. The acknowledgement information or the negative acknowledgement information may be used to represent a packet loss rate of a data packet in a process in which the terminal device transmits data according to the second modulation and coding indication information. Therefore, the terminal device adjusts the second modulation and coding indication information based on the acknowledgement information or the negative acknowledgement information, so that the packet loss rate of a data packet can be reduced while a data transmission rate is ensured, thereby ensuring QoS of data transmission.

With reference to the first aspect and the foregoing possible implementations, in another possible implementation of this application, the "adjusting, by the terminal device, the second modulation and coding indication information based on the acknowledgement information or the negative acknowledgement information" may include: increasing, by the terminal device, the second MCS and/or the second RI after consecutively receiving K1 pieces of acknowledgement information or decreasing, by the terminal device, the second. MCS and/or the second RI after receiving K2 pieces of negative acknowledgement information in K3 consecutive subframes, where K1>0, K2>0, and K3>0. Because the terminal device consecutively receives the K1 pieces of acknowledgement information, it indicates that a large percentage of data transmitted by the terminal device is correct, in other words, the packet loss rate of a data packet is low. In this case, when the terminal device increases the second MCS and/or the second RI, a data transmission rate can be improved while QoS of data transmission is ensured. Because the terminal device receives the K2 pieces of negative acknowledgement information in the K3 consecutive subframes, it indicates that a small percentage of data transmitted by the terminal device is correct, in other words, the packet loss rate of a data packet is high. In this case, when the terminal device decreases the second MCS and/or the second RI. QoS of data transmission can be ensured.

According to a second aspect of this application, a data transmission rate control method is provided, including: sending, by a base station, beam indication information to a terminal device, where the beam indication information includes a set of N candidate beam pair links BPLs, and N≥1; sending, by the base station, scheduling information to the terminal device, where the scheduling information includes resource indication information and first modulation and coding indication information, and the first modulation and coding indication information includes a first modulation and coding parameter MCS and/or a first rank indication RI; receiving, by the base station, second modulation and coding indication information sent by the terminal device, where the second modulation and coding indication information is determined by the terminal device according to the first modulation and coding indication information, and the second modulation and coding indication information includes a second MCS and/or a second RI; and decoding, by the base station, data according to the second modulation and coding indication information. In this application, the base station may send the beam indication information and the scheduling information to the terminal device, so that the terminal device transmits data on at least one beam based on the scheduling information. The beam indication information is used to indicate a beam required for data transmission, the resource indication information is determined by the base station based on a data packet size of the data, the resource indication information is used to indicate a data block required for data transmission, and the first modulation and coding indication information is used to indicate a transmission rate and/or bandwidth required for data transmission. Therefore, the terminal device transmits the data on the at least one beam according to the resource indication information and the second modulation and coding indication information. In other words, when the terminal device transmits the data on the at least one beam and on the data block required for data transmission at a transmission rate and/or bandwidth higher than the transmission rate and/or bandwidth that is required for data transmission and that is indicated by the first modulation and coding indication information, normal data transmission can be ensured, in other words, QoS of data transmission can be ensured. In addition, in a process of transmitting data based on the scheduling information, the terminal device may adaptively adjust the first modulation and coding indication information according to the first modulation and coding indication information, to be specific, transmit the data according to the second modulation and coding indication information. Therefore, when transmitting the data based on the scheduling information, the terminal device may transmit the data for a plurality of times based on the scheduling information, and the base station is not required to generate corresponding scheduling information each time data is transmitted. Compared with the prior art in which the base station measures a reference signal in real time to obtain CSI and generates scheduling information based on the CSI, this reduces overheads for generating the scheduling information.

With reference to the second aspect, in a possible implementation of this application, the set of N candidate BPLs may include N terminal-side beams. Correspondingly, the method in this application may further include: sending, by the base station, measurement indication information to the terminal device. The measurement indication information includes uplink measurement results of the N terminal-side beams, and the base station may send, to the terminal device in a form of scheduling signaling, measurement indication information including the uplink measurement results of the N terminal-side beams.

With reference to the second aspect and the foregoing possible implementation, in another possible implementation of this application. When the set of N candidate BPLs includes the N terminal-side beams, the method in this application may further include: determining, by the base station, the first modulation and coding indication information based on the uplink measurement results of the N terminal-side beams. The first modulation and coding indication information includes a first MCS and/or a first RI. The first MCS is an MCS corresponding to a minimum transmission rate that is required for data transmission and that is determined by the base station. The first RI is a quantity of transmission layers corresponding to minimum bandwidth required for data transmission.

With reference to the second aspect and the foregoing possible implementations, in another possible implementation of this application, the set of N candidate BPLs may include N base station-side beams. Correspondingly, the method in this application may further include: receiving, by the base station, downlink measurement results that are of the N base station-side beams and that are sent by the terminal device, where the downlink measurement results of the N base station-side beams are determined by the terminal device by measuring the N base station-side beams; and determining, by the base station, the first modulation and coding indication information based on the downlink measurement results of the N base station-side beams. The downlink measurement results of the N base station-side beams may include channel quality information of downlink channels of the N base station-side beams and channel state information of the downlink channels of the N base station-side beams.

With reference to the second aspect and the foregoing possible implementations, in another possible implementation of this application, the method in this application may further include: sending, by the base station, acknowledgement information or negative acknowledgement information to the terminal device, so that the terminal device adjusts the second modulation and coding indication information based on the acknowledgement information or the negative acknowledgement information. The acknowledgement information or the negative acknowledgement information may be used to represent a packet loss rate of a data packet in a process in which the terminal device transmits data according to the second modulation and coding indication information. Therefore, the terminal device adjusts the second modulation and coding indication information based on the acknowledgement information or the negative acknowledgement information, so that the packet loss rate of a data packet can be reduced while a data transmission rate is ensured, thereby ensuring QoS of data transmission.

According to a third aspect of this application, a terminal device is provided. The terminal device may include a receiving module, a determining module, and a transmission module. The receiving module may be configured to receive beam indication information sent by a base station, where the beam indication information includes a set of N candidate beam pair links BPLs, and N≥1. The receiving module may be further configured to receive scheduling information sent by the base station, where the scheduling information includes resource indication information and first modulation and coding indication information, and the first modulation and coding indication information includes a first modulation and coding parameter MCS and/or a first rank indication RI. The determining module may be configured to determine at least one beam based on the set of N candidate BPLs. The determining module may be further configured to determine second modulation and coding indication information according to the first modulation and coding indication information, where the second modulation and coding indication information includes a second MCS and/or a second RI. The transmission module may be configured to transmit data on the at least one beam according to the resource indication information and the second modulation and coding indication information.

With reference to the third aspect, in a possible implementation of this application, the set of N candidate BPLs may include N terminal-side beams. Correspondingly, the receiving module may be further configured to receive measurement indication information sent by the base station, where the measurement indication information includes uplink measurement results of the N terminal-side beams. Correspondingly, the determining module may be specifically configured to determine the at least one beam from the N terminal-side beams based on the uplink measurement results of the N terminal-side beams.

With reference to the third aspect and the foregoing possible implementation, in another possible implementation of this application, when the set of N candidate BPLs includes the N terminal-side beams, the set of N candidate BPLs may specifically include beam sequence numbers of the N terminal-side beams.

With reference to the third aspect and the foregoing possible implementations, in another possible implementation of this application, the set of N candidate BPLs may include N base station-side beams. Correspondingly, the terminal device in this application may further include a measurement module. The measurement module may be configured to measure the N base station-side beams to obtain downlink measurement results of the N base station-side beams. Correspondingly, the determining module may be specifically configured to determine the at least one beam from the N base station-side beams based on the downlink measurement results of the N base station-side beams.

With reference to the third aspect and the foregoing possible implementations, in another possible implementation of this application, when the set of N candidate BPLs includes the N base station-side beams, the set of N candidate BPLs specifically includes beam sequence numbers of the N base station-side beams.

With reference to the third aspect and the foregoing possible implementations, in another possible implementation of this application, after "the transmission module transmits the data on the at least one beam according to the resource indication information and the second modulation and coding indication information", the terminal device in this application may further include a sending module. The sending module may be configured to send the second modulation and coding indication information to the base station, so that the base station decodes the data according to the second modulation and coding indication information.

With reference to the third aspect and the foregoing possible implementations, in another possible implementation of this application, the receiving module may be further configured to receive acknowledgement information or negative acknowledgement information sent by the base station. Correspondingly, the terminal device in this application may further include an adjustment module. The adjustment module may be configured to adjust the second modulation and coding indication information based on the acknowledgement information or the negative acknowledgement information.

With reference to the third aspect and the foregoing possible implementations, in another possible implementation of this application, the adjustment module may be specifically configured to: increase the second MCS and/or the second RI after consecutively receiving K1 pieces of acknowledgement information; or decrease the second MCS and/or the second RI after receiving K2 pieces of negative acknowledgement information in K3 consecutive subframes, where $K1>0$, $K2=0$, and $K3>0$.

It should be noted that for detailed descriptions of the functional units in the third aspect and the various possible implementations of the third aspect and beneficial effect analysis, refer to corresponding descriptions and technical effects in the first aspect and the various possible implementations of the first aspect. Details are not described herein again.

According to a fourth aspect of this application, a base station is provided. The base station may include a sending module, a receiving module, and a decoding module. The sending module may be configured to send beam indication information to a terminal device, where the beam indication information includes a set of N candidate beam pair links BPLs, and $N \geq 1$. The sending module may be further configured to send scheduling information to the terminal device, where the scheduling information includes resource indication information and first modulation and coding indication information, and the first modulation and coding indication information includes a first modulation and coding parameter MCS and/or a first rank indication RI. The receiving module may be configured to receive second modulation and coding indication information sent by the terminal device, where the second modulation and coding indication information is determined by the terminal device according to the first modulation and coding indication information, and the second modulation and coding indication information includes a second MCS and/or a second RI. The decoding module may be configured to decode data according to the second modulation and coding indication information.

With reference to the fourth aspect, in a possible implementation of this application, the set of N candidate BPLs may include N terminal-side beams. Correspondingly, the sending module may be further configured to send measurement indication information to the terminal device, where the measurement indication information includes uplink measurement results of the N terminal-side beams.

With reference to the fourth aspect and the foregoing possible implementation, in another possible implementation of this application, when the set of N candidate BPLs includes the N terminal-side beams, the base station in this application may further include a first determining module. The first determining module may be configured to determine the first modulation and coding indication information based on the uplink measurement results of the N terminal-side beams.

With reference to the fourth aspect and the foregoing possible implementations, in another possible implementation of this application, the set of N candidate BPLs may include N base station-side beams. Correspondingly, the receiving module may be further configured to receive downlink measurement results of the N base station-side beams sent by the terminal device, where the downlink measurement results of the N base station-side beams are determined by the terminal device by measuring the N base station-side beams. Correspondingly, the base station in this application may further include a second determining module. The second determining module may be configured to determine the first modulation and coding indication information based on the downlink measurement results of the N base station-side beams.

With reference to the fourth aspect and the foregoing possible implementations, in another possible implementation of this application, the sending module may be further configured to send acknowledgement information or negative acknowledgement information to the terminal device, so that the terminal device adjusts the second modulation and coding indication information based on the acknowledgement information or the negative acknowledgement information.

It should be noted that for detailed descriptions of the functional units in the fourth aspect and the various possible implementations of the fourth aspect and beneficial effect analysis, refer to corresponding descriptions and technical effects in the second aspect and the various possible implementations of the second aspect. Details are not described herein again.

According to a fifth aspect of this application, a terminal device is provided. The terminal device may include a processor, a memory, and a communications interface. The memory is configured to store a computer-executable instruction, the processor, the communications interface, and the memory are connected by using a bus, and when the terminal device runs, the processor executes the computer-executable instruction stored in the memory, so that the terminal device performs the data transmission rate control method according to the first aspect and the various optional manners of the first aspect.

According to a sixth aspect of this application, a computer storage medium is provided. The computer storage medium stores one or more pieces of program code. When the processor of the terminal device in the fifth aspect executes the program code, the terminal device performs the data transmission rate control method according to the first aspect and the various optional manners of the first aspect.

For detailed descriptions of the modules of the terminal device in the third aspect and the fifth aspect and corresponding technical effect analysis, refer to detailed descriptions in the first aspect and the various possible implementations of the first aspect. Details are not described again in this embodiment of the present invention.

According to a seventh aspect of this application, a base station is provided. The base station may include a processor, a memory, and a communications interface. The memory is configured to store a computer-executable instruction, the processor, the communications interface, and the memory are connected by using a bus, and when the base station runs, the processor executes the computer-executable instruction stored in the memory, so that the base station performs the data transmission rate control method according to the second aspect and the various optional manners of the second aspect.

According to an eighth aspect of this application, a computer storage medium is provided. The computer storage medium stores one or more pieces of program code. When the processor of the base station in the seventh aspect executes the program code, the terminal device performs the data transmission rate control method according to the second aspect and the various optional manners of the second aspect.

For detailed descriptions of the modules of the base station in the fourth aspect and the seventh aspect and corresponding technical effect analysis, refer to detailed descriptions in the second aspect and the various possible implementations of the second aspect. Details are not described again in this embodiment of the present invention.

DESCRIPTION OF EMBODIMENTS

A data transmission rate control method and a device provided in embodiments of the present invention may be applied to a data transmission rate control process. Specifically, the method and the device may be applied to an uplink data transmission rate control process in NR.

The following explains English acronyms/abbreviations of technical terms in the embodiments of the present invention and corresponding full English expressions/standard English terms and Chinese expressions/Chinese terms, to facilitate understanding of a person skilled in the art. Details are shown in Table 1:

TABLE 1

| English acronym/ abbreviation | Full English expression/standard English term | Chinese expression/Chinese term |
| --- | --- | --- |
| NR | New Radio Access Technology | New Radio technology |
| BPL | Beam Pair Link | Beam pair link |
| QoS | Quality of Service | Quality of service |
| PRB | Physical Resource Block | Physical resource block |
| ACK/NACK | Acknowledgement/Non-Acknowledgement | Acknowledgement/negative acknowledgement |
| MCS | Modulation and Coding Scheme | Modulation and coding parameter |
| RI | Rank Indication | Rank indication |
| TTI | Transmission Time Interval | Transmission time interval |

Figure 1:
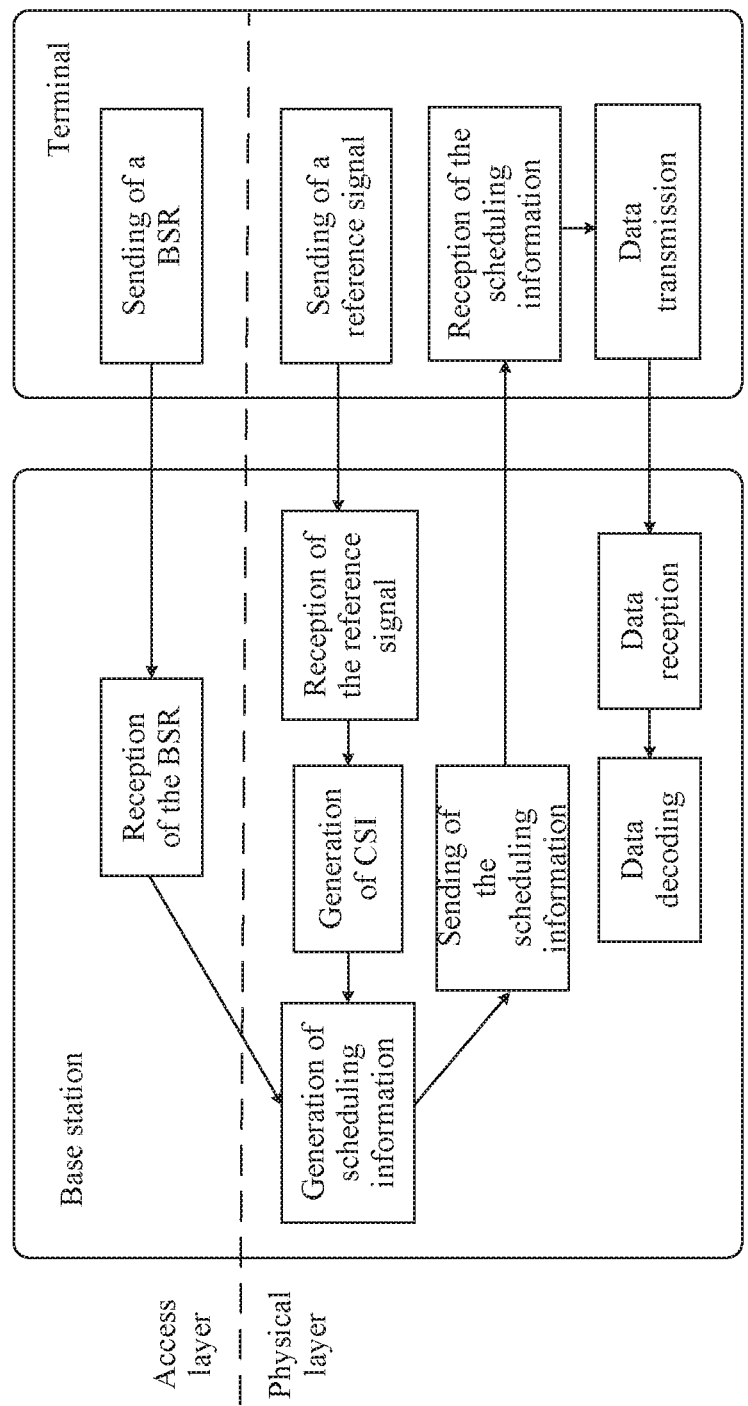
FIG. 1 is a schematic diagram of an existing process of interaction between a base station and a terminal device.
Figure 2:
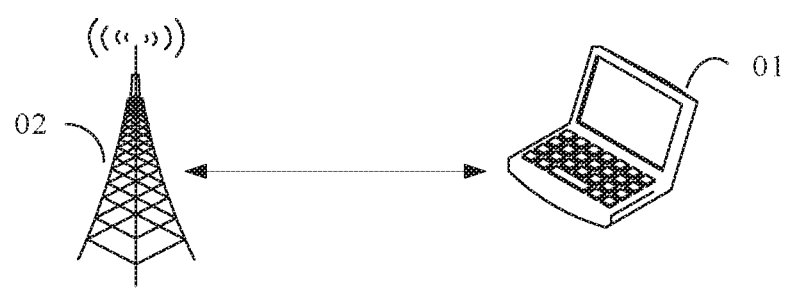
FIG. 2 is a schematic diagram of a system architecture according to an embodiment of the present invention.

FIG. 2 is a schematic diagram of a system architecture according to an embodiment of the present invention. As shown in FIG. 2, the system architecture may include a terminal device 01 and a base station 02. The terminal device 01 and the base station 02 are communicatively connected.

The terminal device 01 is a device that provides voice and/or data connectivity for a user, a handheld device that has a wired/wireless connection function, or another processing device connected to a wireless modem. The terminal device 01 may communicate with one or more core networks by using a radio access network (Radio Access Network, RAN). The terminal device 01 may be a mobile terminal, for example, a mobile phone (or referred to as a "cellular" phone) or a computer that has a mobile terminal; or may be a portable, pocket-sized, handheld, computer built-in, or in-vehicle mobile apparatus that exchanges voice and/or data with the RAN, for example, a device such as a personal communications service (Personal Communications Service, PCS) phone, a cordless phone, a Session Initiation Protocol (SIP) phone, a wireless local loop (Wireless Local Loop, WLL) station, or a personal digital assistant (Personal Digital Assistant, PDA). The terminal device 01 may also be referred to as a user agent (User Agent) or a user device (User Device).

The base station 02 is an apparatus that is deployed in a radio access network to provide a wireless communication function for the terminal device 01. The base station 02 may include various forms of macro base stations, micro base stations, relay stations, access points, or the like. In systems that use different radio access technologies, names of a device that has a function of the base station 02 may be different. For example, in an LTE system, the device is referred to as an evolved NodeB (evolved NodeB, eNB or eNodeB); and in a 3rd Generation mobile communication technology (The 3rd Generation Telecommunication, 3G) system, the device is referred to as a NodeB (NodeB). The name "base station" may vary with evolution of communications technologies.

Figure 3:
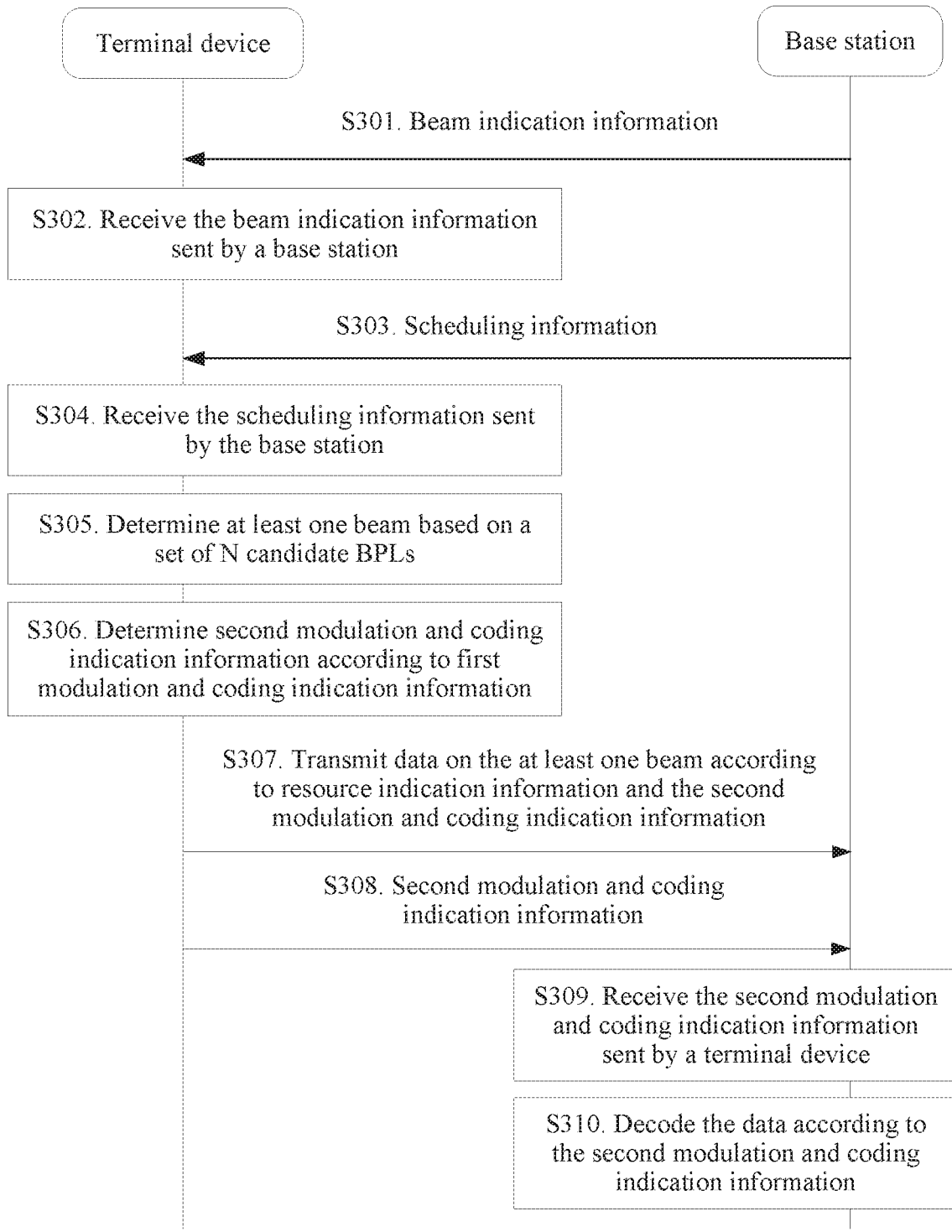
FIG. 3 is a flowchart 1 of a data transmission rate control method according to an embodiment of the present invention.

Based on interaction between the base station and the terminal device in the system shown in FIG. 2, an embodiment of the present invention provides a data transmission rate control method, and in the method, a process of interaction between the terminal device 01 and the base station 02 in the system shown in FIG. 2 is described in detail. Specifically, as shown in FIG. 3, the data transmission rate control method may include S301 to S310.

S301. A base station sends beam indication information to a terminal device.

The beam indication information may represent a status of beam pairing between the base station and the terminal device, and is used to instruct the terminal device to determine a beam used for transmitting data. The beam indication information includes a set of N candidate BPLs, the set of N candidate BPLs includes N terminal-side beams or N base station-side beams, and N≥1. In addition, the N terminal-side beams included in the set of N candidate BPLs may be beam sequence numbers of the N terminal-side beams. The N base station-side beams included in the set of N candidate BPLs may be beam sequence numbers of the N base station-side beams.

In a beam management process, the base station may send the beam indication information to the terminal device in a form of scheduling signaling. Specifically, the base station may perform management based on uplink beam measurement; and send measurement results of the N terminal-side beams to the terminal device in a form of scheduling signaling; or the base station may perform management based on downlink beam measurement, and send measurement results of the N base station-side beams to the terminal device in a form of scheduling signaling.

For example, a process in which the base station performs management based on uplink beam measurement is as follows: The terminal device may send M uplink beam measurement reference signals to the base station; and based on the M uplink beam measurement reference signals and downlink reception beams that match the M uplink beam measurement reference signals, the base station correspondingly calculates reception strength and selects a beam (to be specific, determines the N terminal-side beams), and sends beam indication information including the N terminal-side beams to the terminal device in a form of scheduling signaling. Sequence numbers of the M uplink beam measurement reference signals correspond to the beam sequence numbers of the N terminal-side beams, and M≥N≥1.

For example, based on four uplink beam measurement reference signals sent by the terminal device (sequence numbers of the uplink beam measurement reference signals are respectively 1, 3, 4, and 8), the base station may determine that the beam sequence numbers of the N terminal-side beams may be 1, 3, and 8.

For example, a process in which the base station performs management based on downlink beam measurement is as follows: The base station may send M downlink beam measurement reference signals to the terminal device; and based on the M downlink beam measurement reference signals and uplink reception beams that match the M downlink beam measurement reference signals, the terminal device correspondingly calculates reception strength and selects a beam (to be specific, determines the N base station-side beams), and sends beam indication information including the N base station-side beams to the terminal device in a form of scheduling signaling.

For example, according to beam indication information corresponding to four downlink beam measurement reference signals sent by the terminal device (sequence numbers of the downlink beam measurement reference signals are respectively 1, 5, 6, and 9), the base station may determine that the beam sequence numbers of the N base station-side beams may be 5, 6, and 9.

S302. The terminal device receives the beam indication information sent by the base station.

The terminal device may receive the beam indication information including the N terminal-side beams that is sent by the base station, or the terminal device may receive the beam indication information including the N base station-side beams that is sent by the base station.

For example, the beam indication information received by the terminal device may include the N terminal-side beams with beam sequence numbers 1, 3, and 8; or the beam indication information received by the terminal device may include the N base station-side beams with beam sequence numbers 5, 6, and 9.

S303. The base station sends scheduling information to the terminal device.

The scheduling information includes resource indication information and first modulation and coding indication information, and the first modulation and coding indication information includes a first MCS and/or a first RI. After determining the scheduling information (namely, the resource indication information and the first modulation and coding indication information), the base station may send the scheduling information to the terminal device in a form of scheduling signaling.

An MCS may be used to feed back a transmission rate required for data transmission, and an RI may be used to teed back bandwidth required for data transmission. In this embodiment of the present invention, the first MCS may be an MCS corresponding to a minimum transmission rate that is required for data transmission and that is determined by the base station, and the first RI may be a quantity of transport layers corresponding to minimum bandwidth required for data transmission.

The resource indication information may be used to indicate a physical resource block (Physical Resource Block, PRB) required for data transmission, and the resource indication information may include a PRB location and a PRB quantity for data transmission. The resource indication information in this embodiment of the present invention may be a PRB location and a PRB quantity that meet minimum QoS required by a current service of the terminal device.

It should be noted that, for ease of description, this embodiment of the present invention is described only by using an example in which the first MCS is an MCS corresponding to a minimum transmission rate that is required for data transmission and that is determined by the base station, the first RI is a quantity of transport layers corresponding to minimum bandwidth required for data transmission, and the resource indication information is a PRB location and a PRB quantity that meet minimum QoS required for a current service of the terminal device. However, this does not constitute a limitation on a scope of this embodiment of the present invention.

The base station may determine the first modulation and coding indication information based on uplink measurement results of the N terminal-side beams, or the base station may determine the first modulation and coding indication information based on downlink measurement results of the N base station-side beams.

For example, a process in which the base station determines the first modulation and coding indication information based on the uplink measurement results of the N terminal-side beams is as follows: The terminal device sends M uplink beam measurement reference signals to the base station; the base station correspondingly calculates reception strength based on the uplink beam measurement reference signals and downlink reception beams that match the uplink beam measurement reference signals, to obtain the uplink measurement results of the N terminal-side beams; and the base station determines the first modulation and coding indication information based on the uplink measurement results of the N terminal-side beams.

For example, it is assumed that sequence numbers of four uplink beam measurement reference signals sent by the terminal device are respectively 1, 3, 4, and 8, and beam sequence numbers that are of the N terminal-side beams and that are determined by the base station may be 1, 3, and 8. The base station correspondingly calculates reception strength based on the uplink beam measurement reference signals and downlink reception beams that match the uplink beam measurement reference signals, to obtain three uplink measurement results of terminal-side beams, and selects, from the three uplink measurement results of the terminal-side beams, a corresponding MCS (namely, the first MCS) corresponding to the minimum transmission rate required for data transmission and/or an RI (namely, the first RI) corresponding to the minimum bandwidth required for data transmission.

For example, a process in which the base station determines the first modulation and coding indication information based on the downlink measurement results of the N base station-side beams is as follows: The base station sends M downlink beam measurement reference signals to the terminal device; the terminal device correspondingly calculates reception strength based on the downlink beam measurement reference signals and uplink reception beams that match the downlink beam measurement reference signals, to obtain the downlink measurement results of the N base station-side beams; and the base station determines the first modulation and coding indication information based on the downlink measurement results of the N base station-side beams.

For example, the base station may determine the first modulation and coding indication information based on the uplink measurement results of the N terminal-side beams or the downlink measurement results of the N base station-side beams. The base station may determine the resource indication information by obtaining a BSR that is fed back by the terminal device. Specifically, the base station may determine service requirement information of the terminal device based on the BSR, to be specific, determine a data packet size of the minimum QoS required by the current service of the terminal device, and then determines the resource indication information based on the data packet size and the determined transmission rate (and/or bandwidth) required for data transmission. The resource indication information may include a PRB location and a PRB quantity for data transmission.

Figure 4:
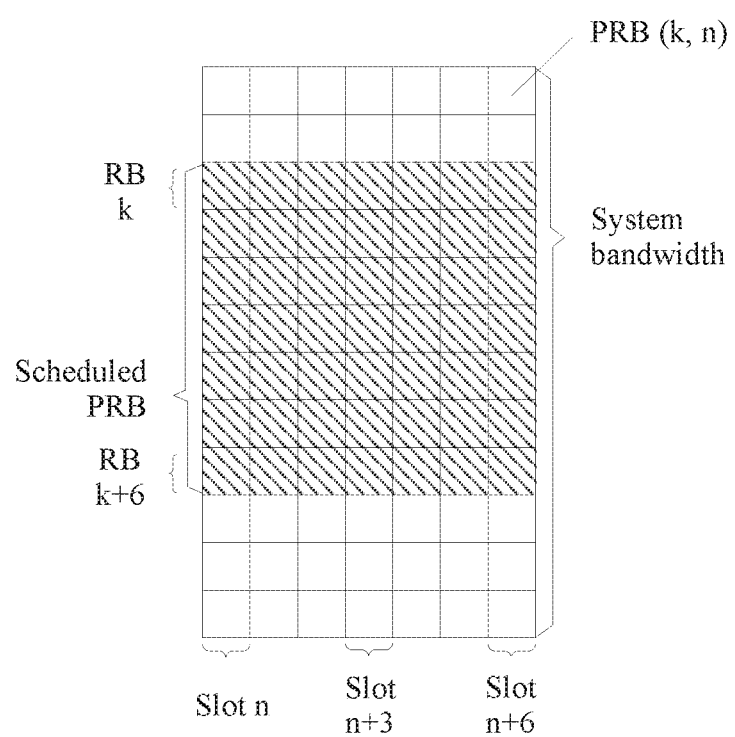
FIG. 4 is a schematic diagram of an example of a PRB according to an embodiment of the present invention.

For example, as shown in FIG. 4, a minimum unit for each time of scheduling in time domain is one slot, and a minimum unit for each time of scheduling in frequency domain is one RB. In other words, a minimum unit for scheduling is one PRB, and is identified by (k, n), where k and n respectively represent coordinates in frequency domain and time domain. The base station may determine, by performing scheduling once, a quantity of PRBs required for data transmission in N scheduling time units. As shown in FIG. 4, the scheduling information is sent for a total of seven slots from n to n+6, and in the seven slots, a total of seven RBs from k to k+6 are scheduled.

S304. The terminal device receives the scheduling information sent by the base station.

The terminal device may receive the resource indication information and the first MCS and/or the first RI.

S305. The terminal device determines at least one beam based on a set of N candidate BPLs.

In this embodiment of the present invention, the base station may interact with the terminal device, and send the beam indication information to the terminal device, and the terminal device may determine the at least one beam based on the set of N candidate BPLs included in the beam indication information.

In this embodiment of the present invention, the set of N candidate BPLs may include N terminal-side beams or N base station-side beams. The terminal device may determine the at least one beam based on the N terminal-side beams, or the terminal device may determine the at least one beam based on the N base station-side beams. Specifically, the terminal device may determine the at least one beam based on uplink measurement results of the N terminal-side beams, or the terminal device may determine the at least one beam based on downlink measurement results of the N base station-side beams.

For example, the set of N candidate BPLs includes beam sequence numbers of the N terminal-side beams, and the terminal device may determine a beam sequence number of the at least one beam based on the uplink measurement results of the N terminal-side beams; or the set of N candidate BPLs includes beam sequence numbers of the N base station-side beams, and the terminal device may determine a beam sequence number of the at least one beam based on the downlink measurement results of the N base station-side beams.

For example, beam sequence numbers of the N terminal-side beams are 1, 3, and 8, and the terminal device may determine, based on uplink measurement results of the three terminal-side beams, that beam sequence numbers of at least one beam for data transmission are 1 and 3. Alternatively, beam sequence numbers of the N base station-side beams are 5, 6, and 9, and the terminal device may determine, based on downlink measurement results of the three base station-side beams, that beam sequence numbers of at least one beam for data transmission are 5 and 9.

S306. The terminal device determines second modulation and coding indication information according to first modulation and coding indication information.

The second modulation and coding indication information includes a second MCS and/or a second RI.

The terminal device may adjust the first modulation and coding indication information to determine the second modulation and coding indication information. Specifically, the terminal device may adjust the first MCS and/or the first RI in the first modulation and coding indication information to determine the second MCS and/or the second RI, so that the second MCS is higher than the first MCS, and/or the second RI is higher than the first RI.

For example, it is assumed that the first MCS in the first modulation and coding indication information determined by the base station is 4, and the first RI is 1 (in other words, a quantity of transport layers is 1). In this case, the terminal device may determine that the second MCS in the second modulation and coding indication information is 5, and/or the second RI is 2.

S307. The terminal device transmits data on the at least one beam according to resource indication information and the second modulation and coding indication information.

After determining the at least one beam, the terminal device may transmit, at a transmission rate corresponding to the second MCS and/or bandwidth corresponding to the second RI, data on the PRB indicated by the resource indication information.

For example, the terminal device may transmit, on the determined at least one beam, data on the PRB shown in FIG. 4 by using a transmission rate corresponding to an MCS that is indicated by the second modulation and coding indication information and that is 5 and/or bandwidth corresponding to RI that is 2.

In the prior art, based on scheduling information sent by the base station, the terminal device transmits data at a transmission rate indicated by the scheduling information. In a process in which the terminal device transmits data based on the scheduling information, the base station needs to measure a reference signal in real time to obtain CSI, and generate the scheduling information based on the CSI. Therefore, overheads for generating the scheduling information are high. In addition, because a transmission channel of a high frequency band is characterized by high dynamics and vulnerability to blocking, a period of sending a reference signal by the terminal device is usually long, thereby causing long latency. Consequently, data cannot be normally transmitted, in other words, QoS of data transmission cannot be ensured.

However, in this embodiment of the present invention, the terminal device may transmit data on the at least one beam according to the resource indication information and the second modulation and coding indication information. Because the terminal device can transmit data at a transmission rate higher than a transmission rate corresponding to the first MCS, a data transmission rate is controlled. In addition, each time data is transmitted, only the first modulation and coding indication information in the scheduling information needs to be adjusted (the adjusted first modulation and coding indication information is referred to as the second modulation and coding indication information), and scheduling information does not need to be generated each time the data is transmitted, thereby reducing overheads for generating the scheduling information. In addition, the terminal device may transmit the data on the at least one beam and on the PRB indicated by the resource indication information, so that normal data transmission is ensured, in other words, QoS of data transmission is ensured.

S308. The terminal device sends the second modulation and coding indication information to the base station.

The terminal device may send the second modulation and coding indication information to the base station while sending the data to the base station. In addition, the terminal device sends the second modulation and coding indication information to the base station on the at least one beam according to the resource indication information.

For example, the resource indication information may include the PRB location and the PRB quantity for data transmission. The terminal device transmits data on the PRB, and sends the second modulation and coding indication information to the base station.

For example, if the terminal device transmits data on the PRB shown in FIG. 4, the terminal device sends the second modulation and coding indication information to the base station on a control channel on the PRB shown in FIG. 4, so that the base station decodes the data according to the second modulation and coding indication information.

S309. The base station receives the second modulation and coding indication information sent by the terminal device.

The base station may receive the second modulation and coding indication information on the N terminal-side beams or the N base station-side beams.

For example, if the terminal device determines the at least one beam from the N terminal-side beams, and transmits data on the at least one beam, the terminal device sends the second modulation and coding indication information on the at least one beam, and the base station receives the second modulation and coding indication information on the at least one beam.

If the terminal device determines the at least one beam from the N base station-side beams, and transmits data on the at least one beam, the terminal device sends the second modulation and coding indication information on the at least one beam, and the base station receives the second modulation and coding indication information on the at least one beam.

S310. The base station decodes the data according to the second modulation and coding indication information.

After receiving the data transmitted by the terminal device and receiving the second modulation and coding indication information sent by the terminal device, the base station decodes the received data according to the second modulation and coding indication information.

It should be noted that in this embodiment of the present invention, there is no strict requirement on an order between S301 and S303. S301 may be performed before S303, or S303 may be performed before S301, or S301 and S303 may be performed simultaneously.

This embodiment of the present invention provides a data transmission rate control method. The terminal device may transmit data on the determined at least one beam according to the resource indication information and the second modulation and coding indication information. The beam indication information is used to indicate a beam required for data transmission, the resource indication information is determined by the base station based on a data packet size of the data, the resource indication information is used to indicate a data block required for data transmission, and the first modulation and coding indication information is used to indicate a transmission rate and/or bandwidth required for data transmission. Therefore, when the terminal device transmits the data on the at least one beam according to the resource indication information and the second modulation and coding indication information, in other words, when the terminal device transmits the data on the at least one beam and on the data block required for data transmission at a transmission rate and/or bandwidth higher than the transmission rate and/or bandwidth that is required for data transmission and that is indicated by the first modulation and coding indication information, normal data transmission can be ensured, in other words, QoS of data transmission can be ensured.

In addition, in a process of transmitting data based on the scheduling information, the terminal device may adaptively adjust the first modulation and coding indication information according to the first modulation and coding indication information, to be specific, transmit the data according to the second modulation and coding indication information. Therefore, when transmitting the data based on the scheduling information, the terminal device may transmit the data for a plurality of times based on the scheduling information, and the base station is not required to generate corresponding scheduling information each time data is transmitted. Compared with the prior art in which the base station measures a reference signal in real time to obtain CSI and generates scheduling information based on the CSI, this reduces overheads for generating the scheduling information.

Further, in an application scenario of this embodiment of the present invention, the set of N candidate BPLs may include N terminal-side beams, or the set of N candidate BPLs may include N base station-side beams. The following separately describes in detail a case in which the set of N candidate BPLs includes N terminal-side beams and a case in which the set of N candidate BPLs includes N base station-side beams in the application scenario of this embodiment of the present invention.

Figure 5A:
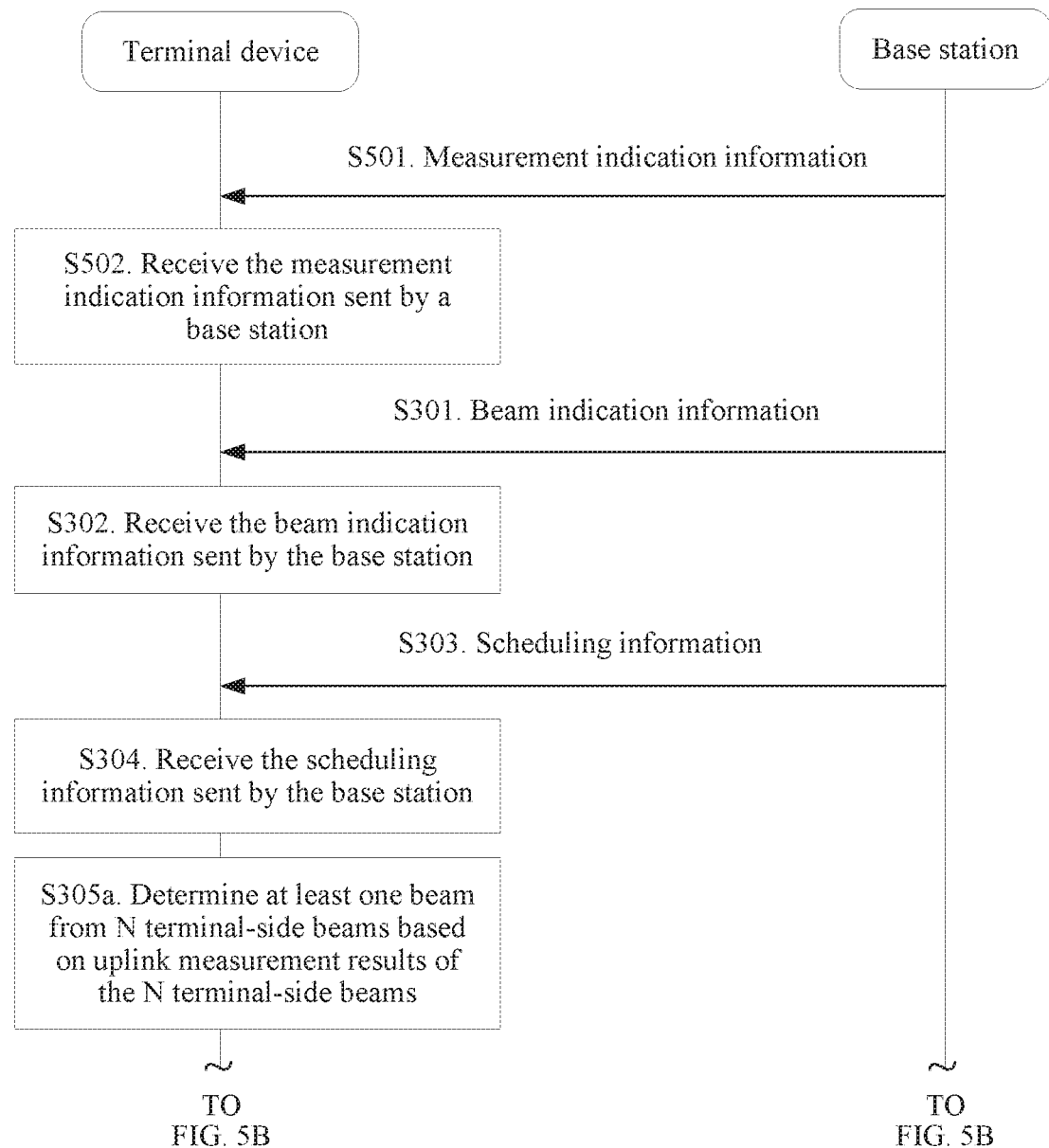
FIG. 5A and FIG. 5B are a flowchart 2 of a data transmission rate control method according to an embodiment of the present invention.
Figure 5B:
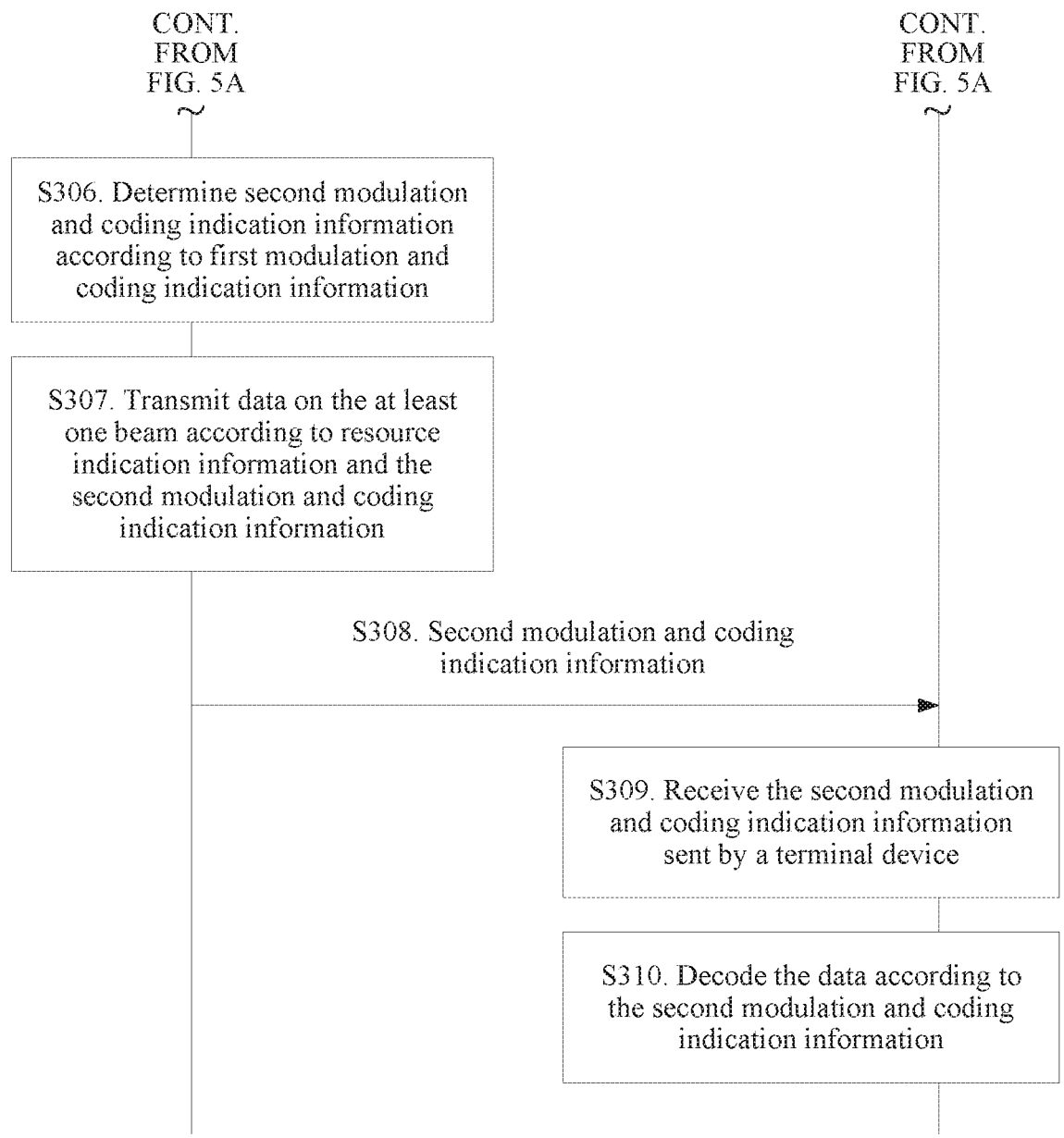

In a first application scenario of the embodiments of the present invention, a set of N candidate BPLs may include N terminal-side beams, and a terminal device may determine at least one beam from the N terminal-side beams. Specifically, FIG. 5A and FIG. 5B show another data transmission rate control method according to an embodiment of the present invention. Compared with the data transmission rate control method shown in FIG. 3, a main difference is that S501 and S502 are added before S301, and S305 is replaced with S305$a$. Only the difference is described in detail herein. Referring to FIG. 5A and FIG. 5B, the method includes the following steps.

S501. A base station sends measurement indication information to a terminal device.

The measurement indication information includes uplink measurement results of N terminal-side beams. The base station may send the measurement indication information to the terminal device in a form of scheduling signaling.

Specifically, a process in which the base station determines the measurement indication information is as follows: The terminal device may send M uplink beam measurement reference signals to the base station; the base station correspondingly calculates reception strength and selects a beam (to be specific, determines the N terminal-side beams) based on the M uplink beam measurement reference signals and downlink reception beams that match the M uplink beam measurement reference signals, and saves an uplink beam measurement result (namely, a sequence number of a selected uplink beam measurement reference signal and corresponding reception strength); and in addition, the base station sends measurement indication information including uplink beam measurement results of the N terminal-side beams to the terminal device in a form of scheduling signaling. Sequence numbers of the M uplink beam measurement reference signals correspond to beam sequence numbers of the N terminal-side beams, and M≥N≥1.

S502. The terminal device receives the measurement indication information sent by the base station.

The terminal device receives the measurement indication information including the uplink measurement results of the N terminal-side beams.

S301. The base station sends beam indication information to the terminal device.

The beam indication information includes a set of N candidate BPLs, the set of N candidate BPLs includes the N terminal-side beams, and N≥1.

S302. The terminal device receives the beam indication information sent by the base station.

The terminal device may receive beam indication information including the N terminal-side beams that is sent by the base station.

S303. The base station sends scheduling information to the terminal device.

The scheduling information includes resource indication information and first modulation and coding indication information, and the first modulation and coding indication information includes a first MCS and/or a first RI.

S304. The terminal device receives the scheduling information sent by the base station.

The terminal device may receive the resource indication information and the first MCS and/or the first RI.

S305a. The terminal device determines at least one beam from N terminal-side beams based on uplink measurement results of the N terminal-side beams.

The measurement indication information may be used to instruct the terminal device to select the at least one beam from the N terminal-side beams based on the uplink measurement results of the N terminal-side beams. After receiving the measurement indication information, the terminal device may select, from the N terminal-side beams based on the uplink measurement results of the N terminal-side beams, at least one beam with good channel quality and an unoccupied channel.

For example, the set of N candidate BPLs includes the beam sequence numbers of the N terminal-side beams, and the terminal device may determine a beam sequence number of the at least one beam based on the uplink measurement results of the N terminal-side beams.

For example, the beam sequence numbers of the N terminal-side beams are 1, 3, and 8, and the terminal device may determine, based on uplink measurement results of the three terminal-side beams, that beam sequence numbers of at least one beam for data transmission are 1 and 3.

S306. The terminal device determines second modulation and coding indication information according to first modulation and coding indication information.

The second modulation and coding indication information includes a second MCS and/or a second RI.

S307. The terminal device transmits data on the at least one beam according to resource indication information and the second modulation and coding indication information.

S308. The terminal device sends the second modulation and coding indication information to the base station.

S309. The base station receives the second modulation and coding indication information sent by the terminal device.

S310. The base station decodes the data according to the second modulation and coding indication information.

It should be noted that in this embodiment of the present invention, there is no strict requirement on an order between S501 and S301. S501 may be performed before S301, or S301 may be performed before S501, or S301 and S501 may be performed simultaneously.

Figure 6A:
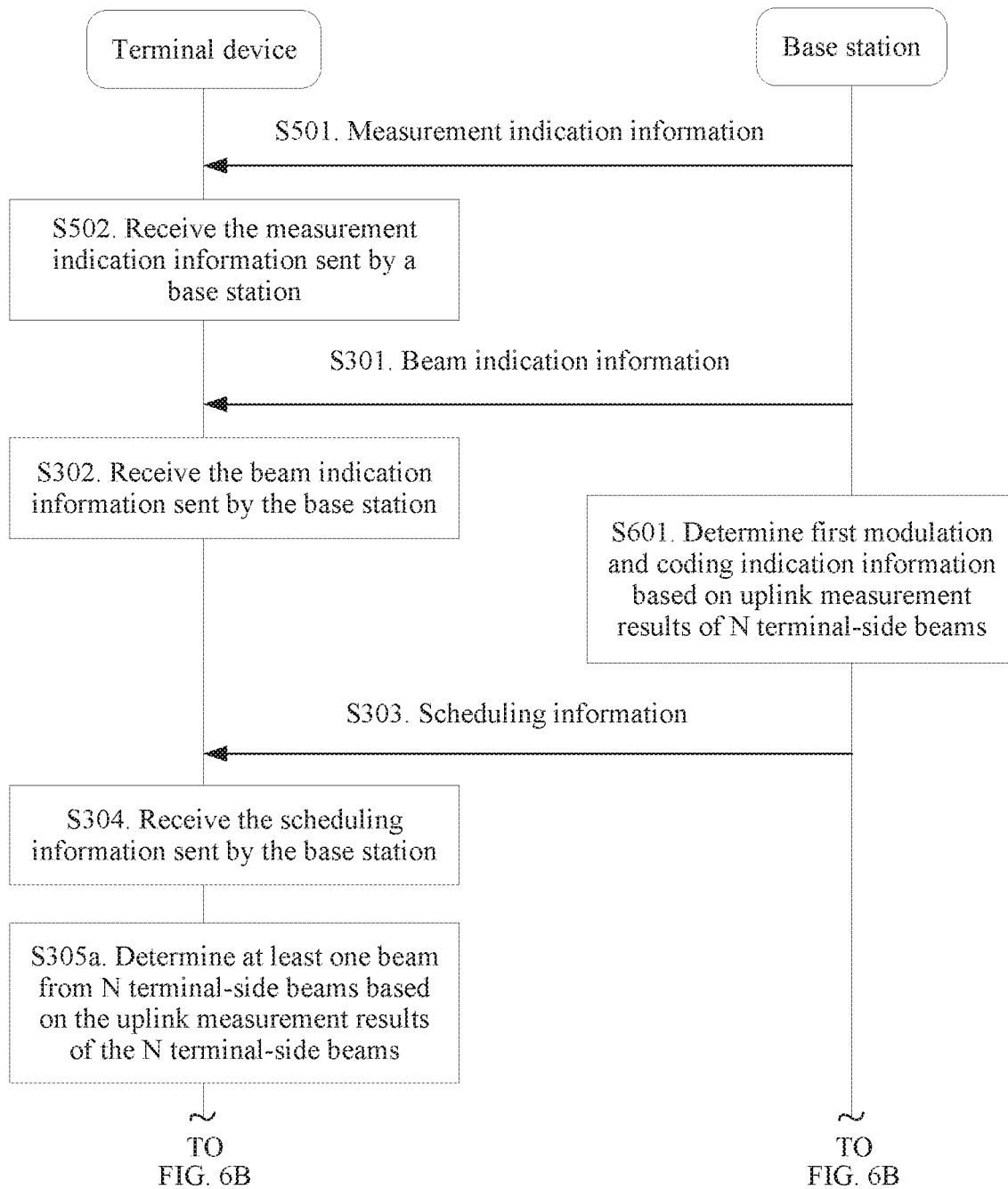
FIG. 6A and FIG. 6B are a flowchart 3 of a data transmission rate control method according to an embodiment of the present invention.
Figure 6B:
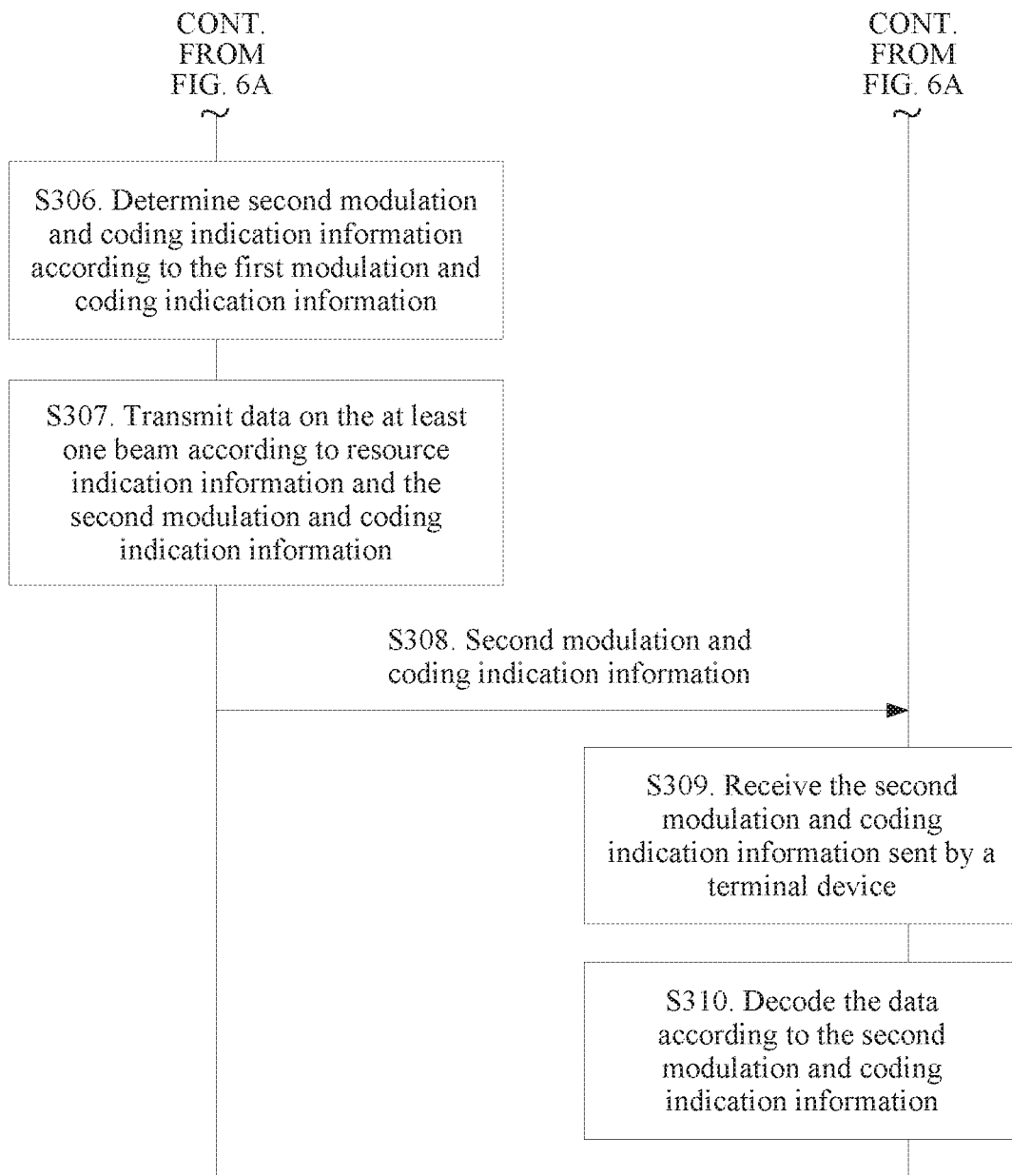

Correspondingly, in the first application scenario of the embodiments of the present invention, to be specific, when the set of N candidate BPLs includes the N terminal-side beams, before sending the scheduling information (namely, the resource indication information and the first modulation and coding indication information) to the terminal device, the base station may first determine the first modulation and coding indication information. Specifically, as shown in FIG. 6A and FIG. 6B, compared with the data transmission rate control method shown in FIG. 5A and FIG. 5B, before S303 shown in FIG. 5A and FIG. 5B, the method in the embodiments of the present invention may further include S601.

S601. The base station determines first modulation and coding indication information based on uplink measurement results of N terminal-side beams.

The first modulation and coding indication information includes a first MCS and/or a first RI. The first MCS is an MCS corresponding to a minimum transmission rate that is required for data transmission and that is determined by the base station. The first RI is a quantity of transmission layers corresponding to minimum bandwidth required for data transmission.

For example, a specific process in which the base station determines the first modulation and coding indication information based on the uplink measurement results of the N terminal-side beams is as follows: The terminal device sends a group of uplink beam measurement reference signals to the base station: the base station correspondingly calculates reception strength based on the uplink beam measurement reference signals and downlink reception beams that match the uplink beam measurement reference signals, to obtain the uplink measurement results of the N terminal-side beams: and the base station determines the first modulation and coding indication information based on the uplink measurement results of the N terminal-side beams.

For example, it is assumed that sequence numbers of four uplink beam measurement reference signals sent by the terminal device are respectively 1, 3, 4, and 8, and beam sequence numbers that are of the N terminal-side beams and that are determined by the base station may be 1, 3, and 8. The base station correspondingly calculates reception strength based on the uplink beam measurement reference signals and downlink reception beams that match the uplink beam measurement reference signals, to obtain three uplink measurement results of terminal-side beams, and selects, from the three uplink measurement results of the terminal-side beams, a corresponding MCS (namely, the first MCS) corresponding to the minimum transmission rate required for data transmission and/or an RI (namely, the first RI) corresponding to the minimum bandwidth required for data transmission.

Figure 7A:
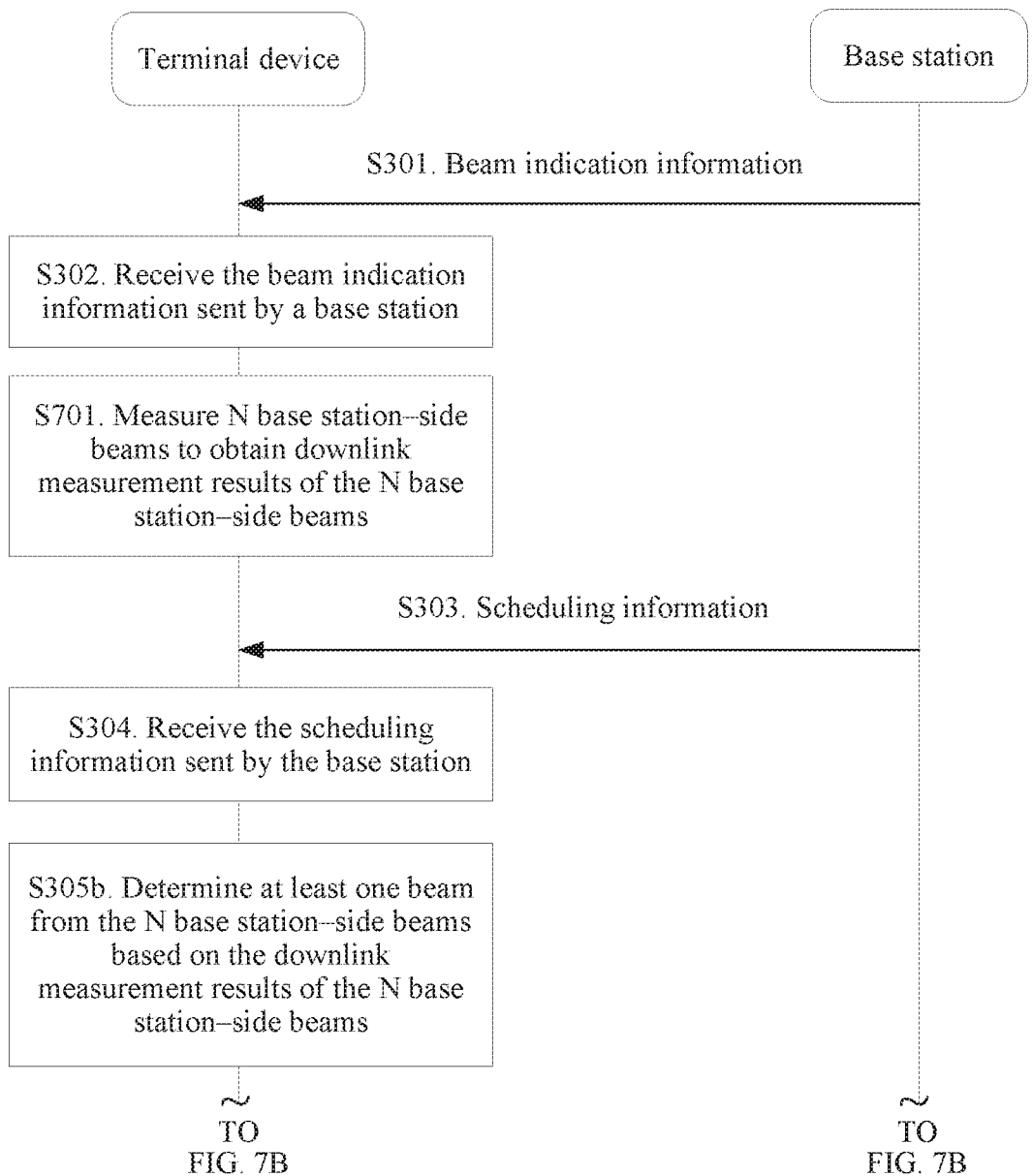
FIG. 7A and FIG. 7B are a flowchart 4 of a data transmission rate control method according to an embodiment of the present invention.
Figure 7B:
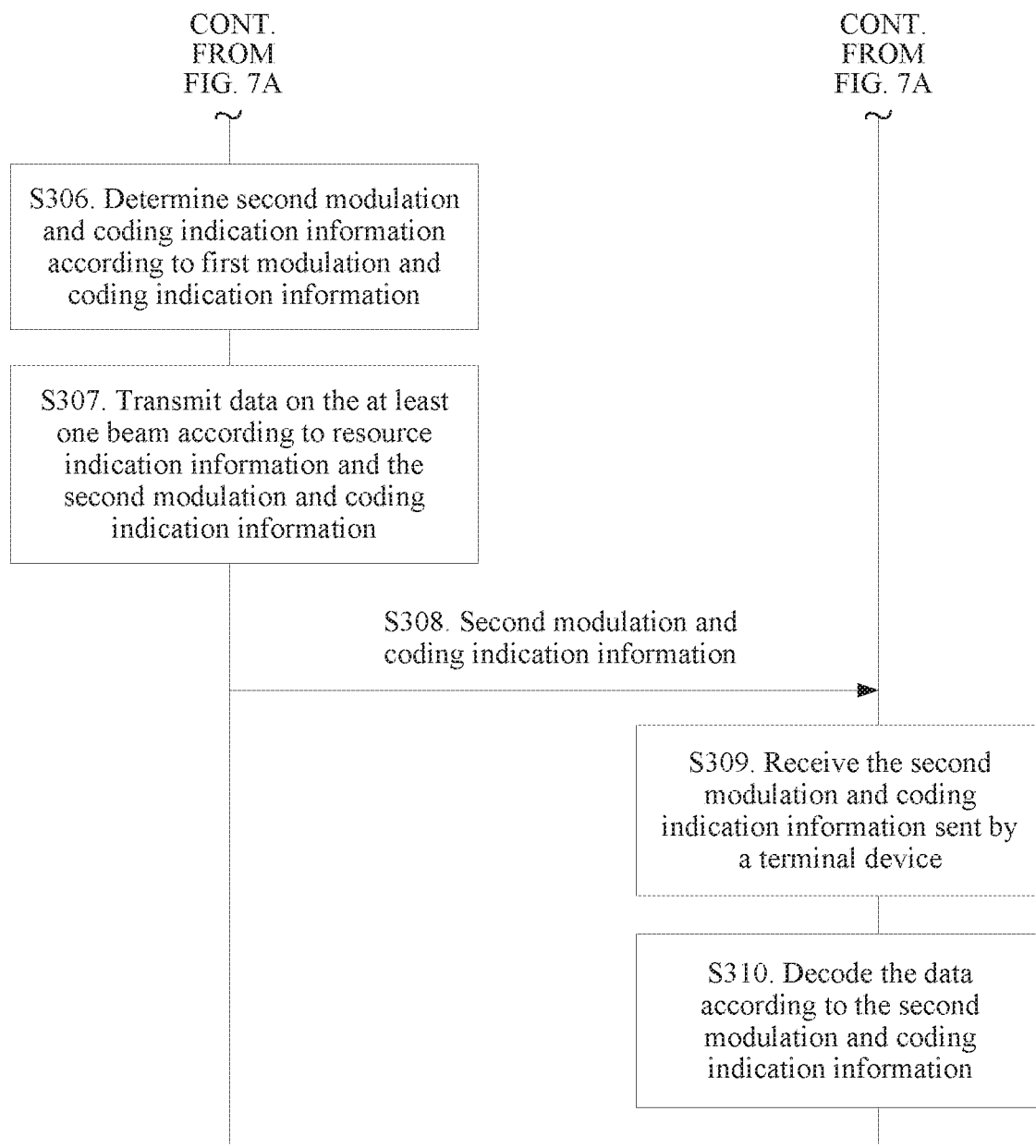

The following describes in detail a case in Which a set of N candidate BPLs includes N base station-side beams in an application scenario of the embodiments of the present invention, in a second application scenario of the embodiments of the present invention, to be specific, the set of N candidate BPLs includes N base station-side beams, a terminal device may determine at least one beam from the N base station-side beams. Specifically, FIG. 7A and FIG. 7B show another data transmission rate control method according to an embodiment of the present invention. Compared with the data transmission rate control method shown in FIG. 3, a main difference is that S701 is added before S303, and S305 is replaced with S305b. Only the difference is described in detail herein. Referring to FIG. 7A and FIG. 7B, the method includes the following steps.

S301. A base station sends beam indication information to a terminal device.

The beam indication information includes a set of N candidate BPLs, the set of N candidate BPLs includes N base station-side beams, and N≥1.

S302. The terminal device receives the beam indication information sent by the base station.

The terminal device may receive the beam indication information including the N base station-side beams that is sent by the base station.

S701. The terminal device measures N base station-side beams to obtain downlink measurement results of the N base station-side beams.

A process in which the terminal device obtains the downlink measurement results of the N base station-side beams is as follows: The terminal device correspondingly calculates reception strength and selects a beam (to be specific, determines the N base station-side beams) based on M downlink beam measurement reference signals sent by the base station and uplink reception beams that match the M downlink beam measurement reference signals, and reports the downlink measurement results of the N base station-side beams (namely, a sequence number of a selected downlink beam measurement reference signal and corresponding reception strength). Sequence numbers of the M downlink beam measurement reference signals correspond to beam sequence numbers of the N base station-side beams, and M≥N≥1.

S303. The base station sends scheduling information to the terminal device.

The scheduling information includes resource indication information and first modulation and coding indication information, and the first modulation and coding indication information includes a first MCS and/or a first RI.

S304. The terminal device receives the scheduling information sent by the base station.

The terminal device may receive the resource indication information and the first MCS and/or the first RI.

S305b. The terminal device determines at least one beam from the N base station-side beams based on the downlink measurement results of the N base station-side beams.

After receiving measurement indication information, the terminal device may select, from the N base station-side beams based on the downlink measurement results of the N base station-side beams, at least one beam with good channel quality and an unoccupied channel.

For example, the set of N candidate BPLs includes the beam sequence numbers of the N base station-side beams, and the terminal device may determine a beam sequence number of the at least one beam based on the downlink measurement results of the N base station-side beams.

For example, the beam sequence numbers of the N base station-side beams are 5, 6, and 9, and the terminal device may determine, based on downlink measurement results of the three base station-side beams, that beam sequence numbers of at least one beam for data transmission are 5 and 9.

S306. The terminal device determines second modulation and coding indication information according to first modulation and coding indication information.

The second modulation and coding indication information includes a second MCS and/or a second RI.

S307. The terminal device transmits data on the at least one beam according to resource indication information and the second modulation and coding indication information.

S308. The terminal device sends the second modulation and coding indication information to the base station.

S309. The base station receives the second modulation and coding indication information sent by the terminal device.

S310. The base station decodes the data according to the second modulation and coding indication information.

Figure 8A:
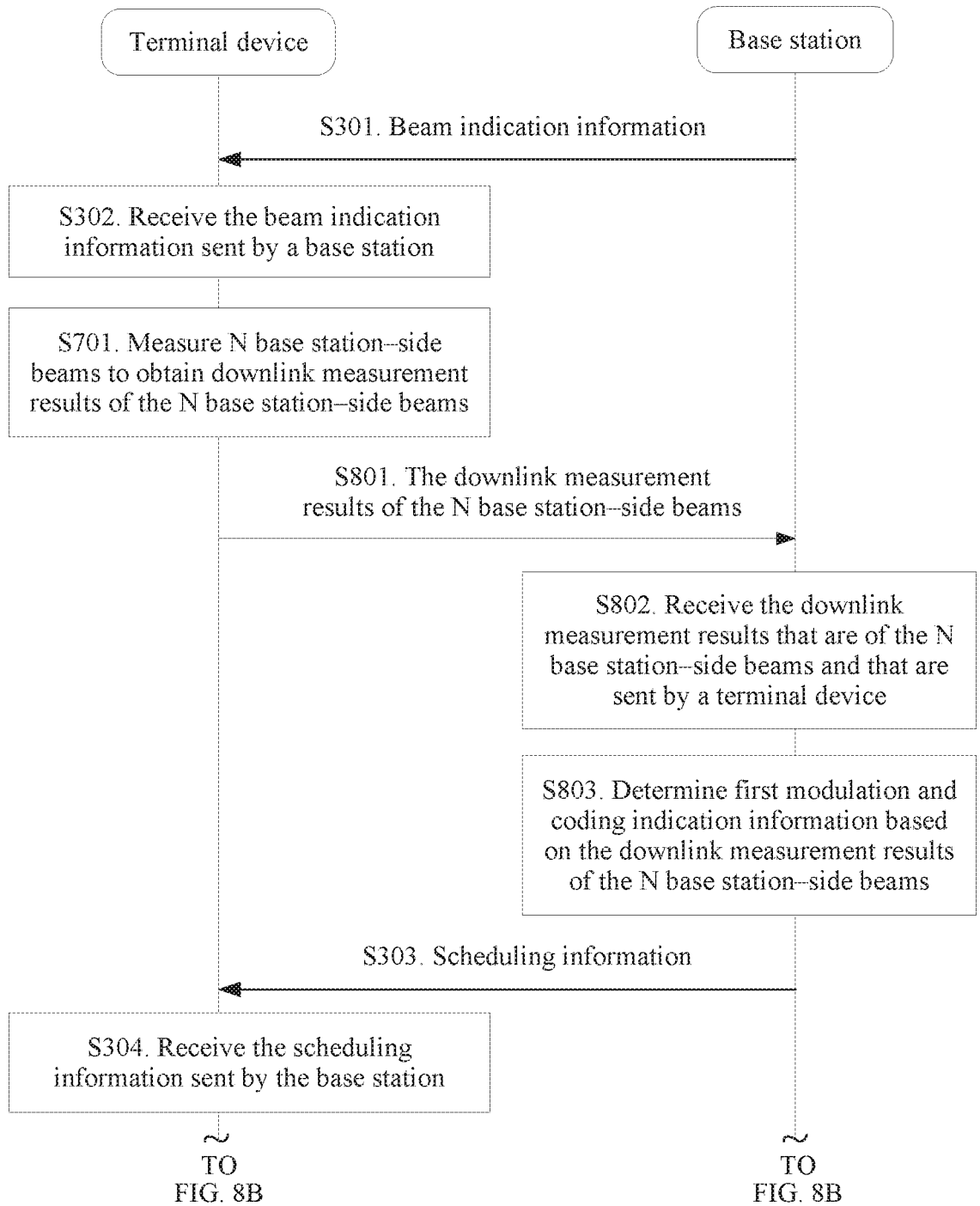
FIG. 8A and FIG. 8B are a flowchart 5 of a data transmission rate control method according to an embodiment of the present invention.
Figure 8B:
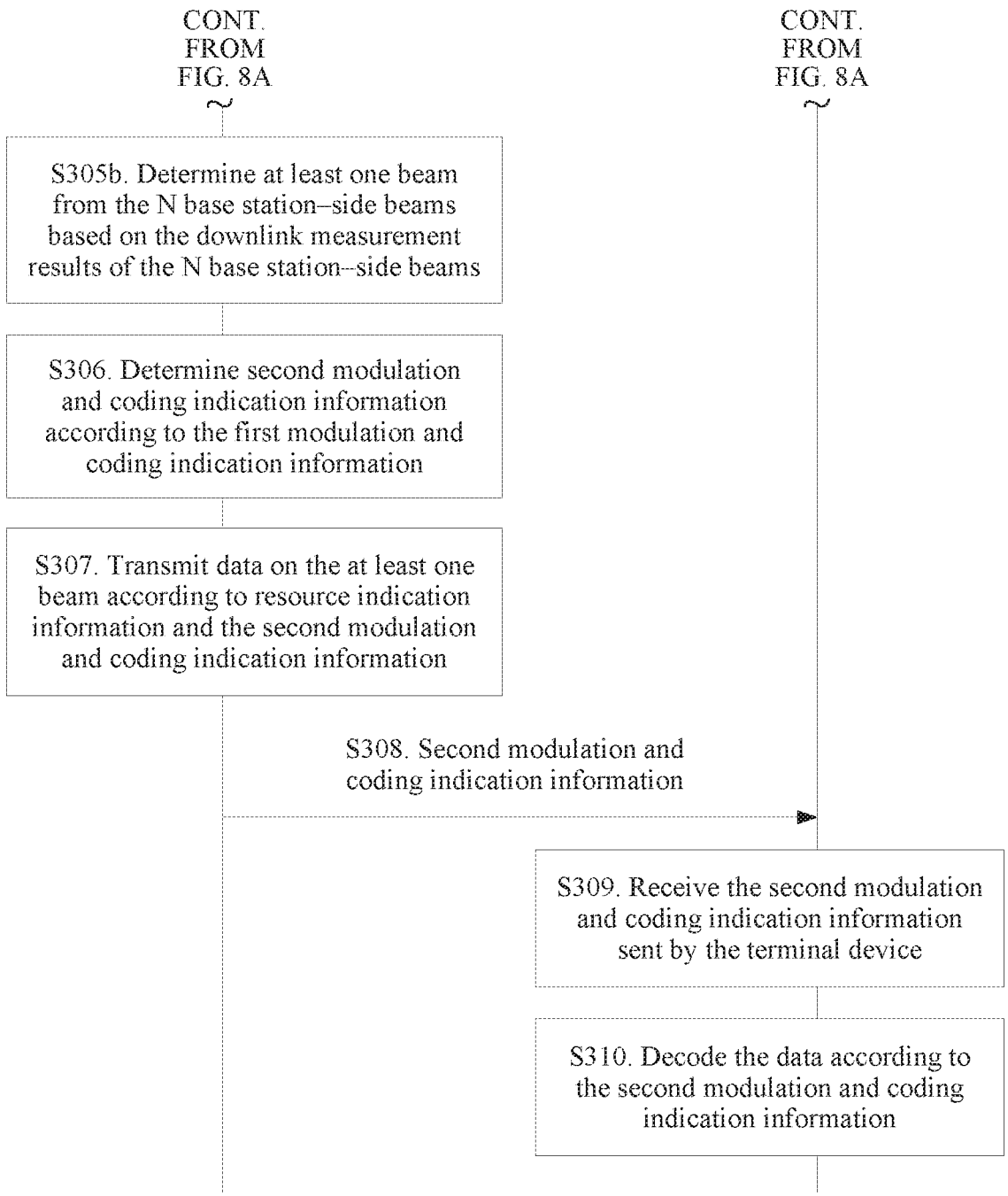

Correspondingly, in the second application scenario of the embodiments of the present invention, to be specific, when the set of N candidate BITs includes N base station-side beams, before sending the scheduling information (namely, the resource indication information and the first modulation and coding indication information) to the terminal device, the base station may first determine the first modulation and coding indication information. Specifically, as shown in FIG. 8A and FIG. 8B, compared with the data transmission rate control method shown in FIG. 7A and FIG. 7B, after S701 and before S303 shown in FIG. 7A and FIG. 7B, the method in the embodiments of the present invention may further include S801 to S803.

S801. The terminal device sends downlink measurement results of N base station-side beams to the base station.

After measuring the N base station-side beams and obtaining the downlink measurement results of the N base station-side beams, the terminal device may send the downlink measurement results of the N base station-side beams to the base station.

For example, the downlink measurement results of the N base station-side beams may include a sequence number of a selected downlink beam measurement reference signal and corresponding reception strength.

S802. The base station receives the downlink measurement results that are of the N base station-side beams and that are sent by the terminal device.

S803. The base station determines first modulation and coding indication information based on the downlink measurement results of the N base station-side beams.

The first modulation and coding indication information includes a first MCS and/or a first RI. The first MCS is an MCS corresponding to a minimum transmission rate that is required for data transmission and that is determined by the base station. The first RI is a quantity of transmission layers corresponding to minimum bandwidth required for data transmission.

For example, a specific process in which the base station determines the first modulation and coding indication information based on the downlink measurement results of the N base station-side beams is as follows: The base station sends a group of downlink beam measurement reference signals to the terminal device; the terminal device correspondingly calculates reception strength based on the downlink beam measurement reference signals and uplink reception beams that match the downlink beam measurement reference signals, to obtain the downlink measurement results of the N base station-side beams; and the base station determines the first modulation and coding indication information based on the downlink measurement results of the N base station-side beams.

For example, it is assumed that the base station may determine, based on four downlink beam measurement reference signals sent by the terminal device (sequence numbers of the downlink beam measurement reference signals are respectively 1, 5, 6, and 9), that beam sequence numbers of the N base station-side beams may be 5, 6, and 9. The base station correspondingly calculates reception strength based on the downlink beam measurement reference signals and downlink reception beams that match the downlink beam measurement reference signals, to obtain three downlink measurement results of the base station-side beams, and selects, from the three downlink measurement results of the base station-side beams, a corresponding MCS (namely, the first MCS) corresponding to the minimum transmission rate required for data transmission and/or an RI (namely, the first RI) corresponding to the minimum bandwidth required for data transmission.

Figure 9A:
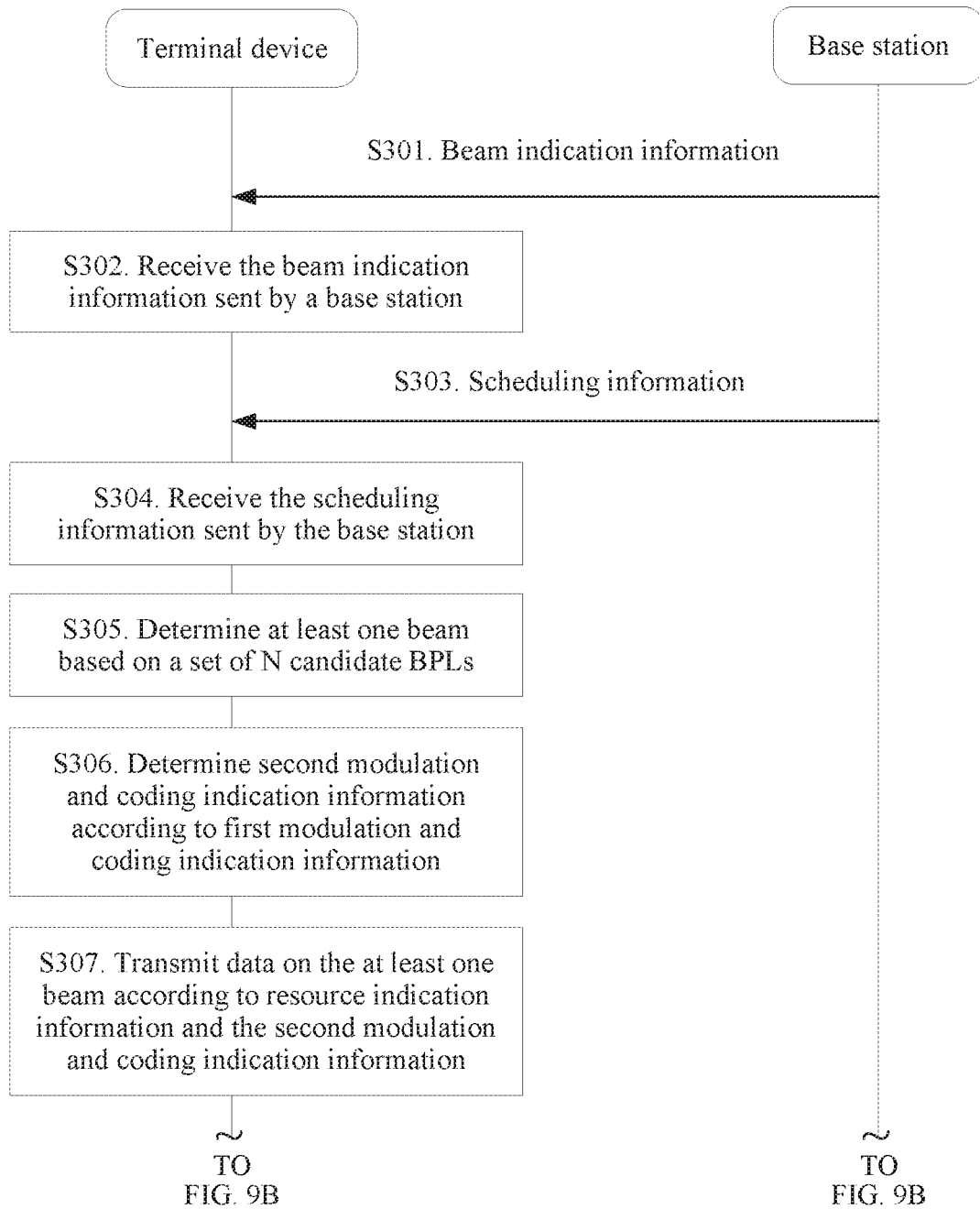
FIG. 9A and FIG. 9B are a flowchart 6 of a data transmission rate control method according to an embodiment of the present invention.
Figure 9B:
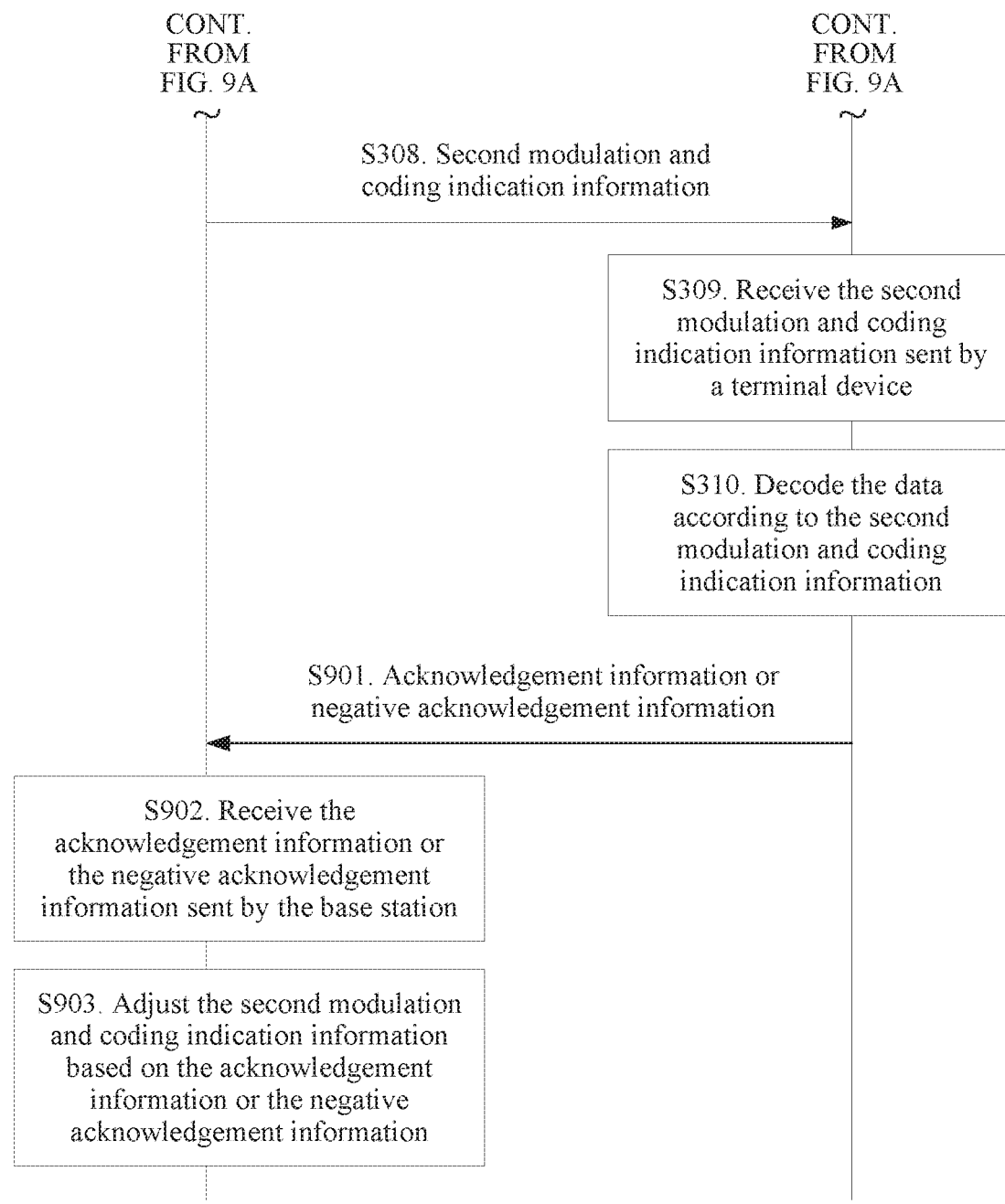

Further, according to the data transmission rate control method provided in the embodiments of the present invention, QoS of data transmission may be further ensured by adjusting second modulation and coding indication information. Specifically, as shown in FIG. 9A and FIG. 9B, compared with the data transmission rate control method shown in FIG. 3, after S310 shown in FIG. 3, the method in the embodiments of the present invention may further include S901 to S903.

S901. The base station sends acknowledgement information or negative acknowledgement information to the terminal device.

The acknowledgement information or the negative acknowledgement information sent by the base station may be used to represent correctness of data transmission. After decoding data, the base station may feed back the acknowledgement information or the negative acknowledgement information (namely, the ACK/NACK information) to the terminal device based on a decoding result.

For example, after receiving and decoding data transmitted by the terminal device, the base station may perform error detection on the decoded data. If the data is correct, the base station feeds back the ACK information to the terminal device, and the ACK information may be used to indicate that a packet loss rate of a data packet is relatively low when the terminal device transmits data according to the second modulation and coding indication information. If the data is incorrect, the base station feeds back the NACK information to the terminal device, and the NACK information may be used to indicate that a packet loss rate of a data packet is relatively high when the terminal device transmits data according to the second modulation and coding indication information.

S902. The terminal device receives the acknowledgement information or the negative acknowledgement information sent by the base station.

S903. The terminal device adjusts the second modulation and coding indication information based on the acknowledgement information or the negative acknowledgement information.

The terminal device may determine, based on the received acknowledgement information or negative acknowledgement information, whether the second modulation and coding indication information needs to be adjusted in a data transmission process. After receiving the acknowledgement information or the negative acknowledgement information, the terminal device may adjust the second modulation and coding indication information, to be specific, adjust the second MCS and/or the second RI.

For example, after receiving the ACK information fed back by the base station, the terminal device may adjust the second MCS and/or the second RI; and after receiving the NACK information fed back by the base station, the terminal device may adjust the second MCS and/or the second RI.

The acknowledgement information or the negative acknowledgement information may be used to represent a packet loss rate of a data packet in a process in which the terminal device transmits data according to the second modulation and coding indication information. Therefore, the terminal device adjusts the second modulation and coding indication information based on the acknowledgement information or the negative acknowledgement information, so that the packet loss rate of a data packet can be reduced while a data transmission rate is ensured, thereby ensuring QoS of data transmission.

Figure 10A:
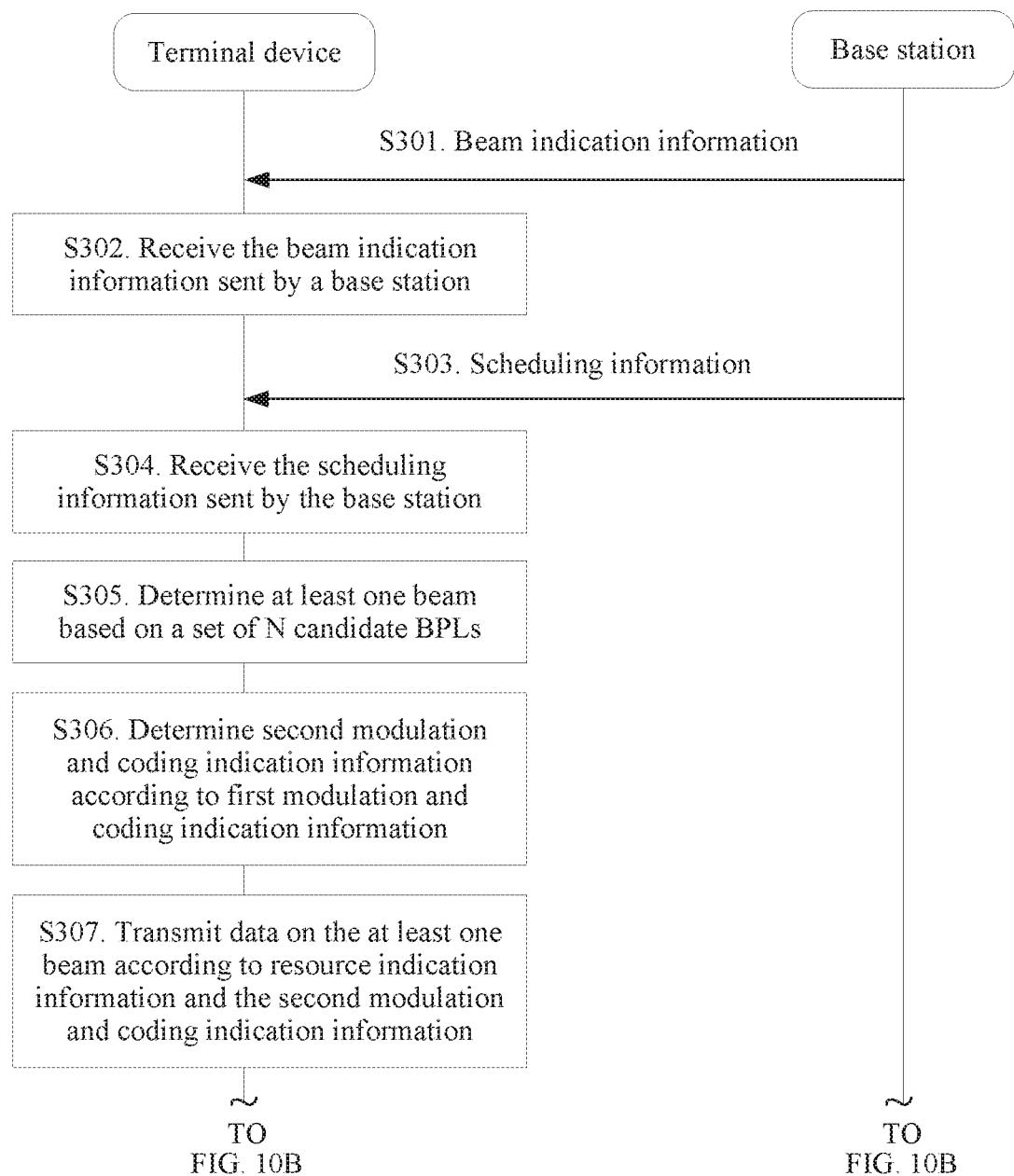
FIG. 10A and FIG. 10B are a flowchart 7 of a data transmission rate control method according to an embodiment of the present invention.
Figure 10B:
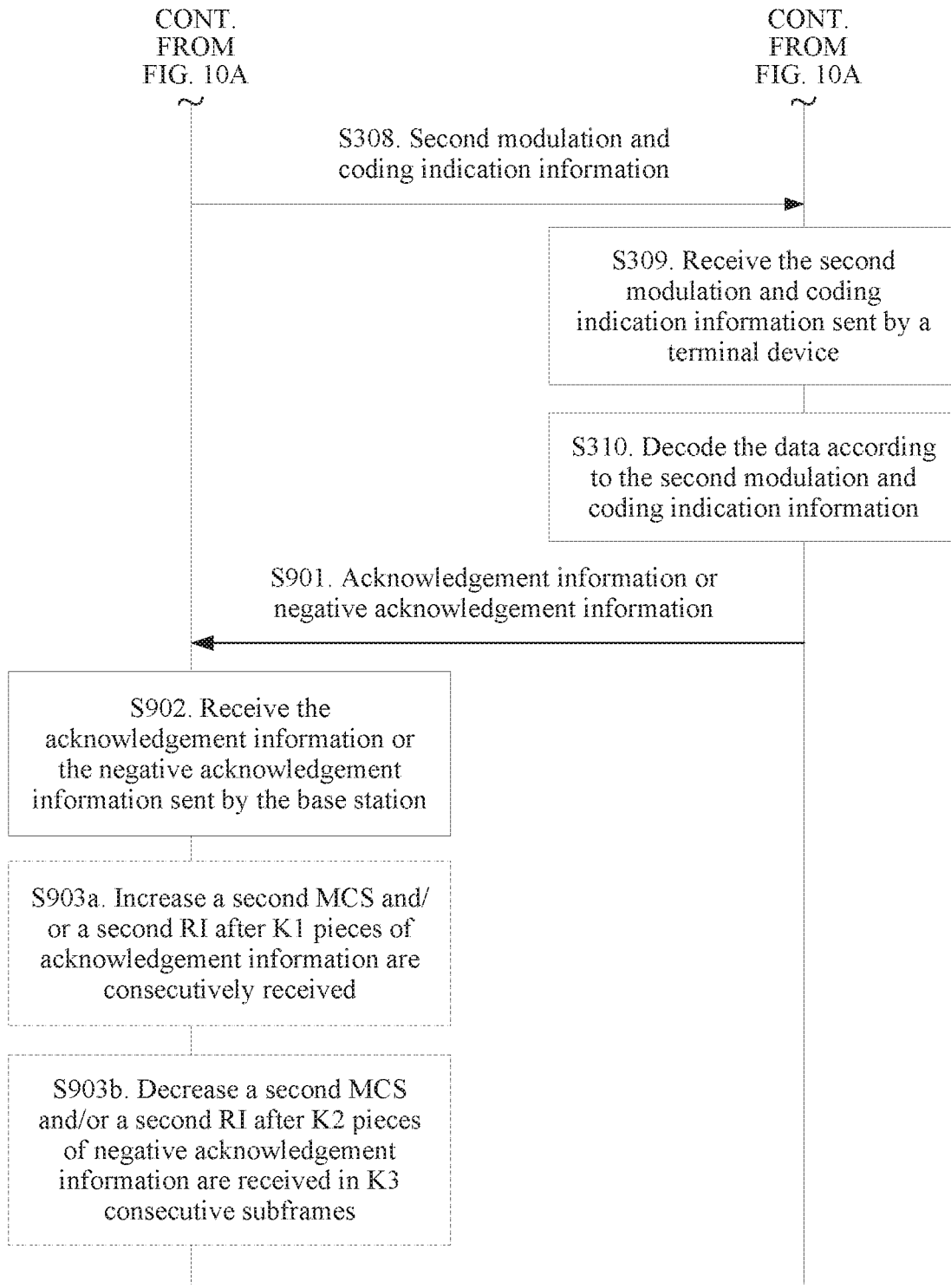

The following describes in detail how the terminal device adjusts the second modulation and coding indication information (namely, the second MCS and/or the second RI). Specifically, as shown in FIG. 10A and FIG. 10B, compared with the data transmission rate control method shown in FIG. 9A and FIG. 9B, a main difference is that S903 is replaced with S903a or S903b. Only the difference is described in detail herein. Referring to FIG. 10A and FIG. 10B, the method includes the following steps.

S301. A base station sends beam indication information to a terminal device.

The beam indication information includes a set of N candidate BPLs, the set of N candidate BPLs includes N terminal-side beams or N base station-side beams, and N≥1.

S302. The terminal device receives the beam indication information sent by the base station.

S303. The base station sends scheduling information to the terminal device.

The scheduling information includes resource indication information and first modulation and coding indication information, and the first modulation and coding indication information includes a first MCS and/or a first RI.

S304. The terminal device receives the scheduling information sent by the base station.

The terminal device may receive the resource indication information and the first MCS and/or the first RI.

S305. The terminal device determines at least one beam based on a set of N candidate BPLs.

S306. The terminal device determines second modulation and coding indication information according to first modulation and coding indication information.

The second modulation and coding indication information includes a second MCS and/or a second RI.

S307. The terminal device transmits data on the at least one beam according to resource indication information and the second modulation and coding indication information.

After determining the at least one beam, the terminal device may transmit, at a transmission rate corresponding to the second MCS and or bandwidth corresponding to the second RI, data on a PRB indicated by the resource indication information.

S308. The terminal device sends the second modulation and coding indication information to the base station.

S309. The base station receives the second modulation and coding indication information sent by the terminal device.

S310. The base station decodes the data according to the second modulation and coding indication information.

S901. The base station sends acknowledgement information or negative acknowledgement information to the terminal device.

S902. The terminal device receives the acknowledgement information or the negative acknowledgement information sent by the base station.

S903a. The terminal device increases a second MCS and/or a second RI after consecutively receiving K1 pieces of acknowledgement information.

K1>0, If the terminal device consecutively receives K1 pieces of acknowledgement information, it may indicate that a large percentage of data transmitted by the terminal device is correct, in other words, a packet loss rate of a data packet is low. In this case, the terminal device may increase the second MCS and/or the second RI.

Because the terminal device consecutively receives the K1 pieces of acknowledgement information, it indicates that a large percentage of data transmitted by the terminal device is correct, in other words, the packet loss rate of a data packet is low. In this case, when the terminal device increases the second MCS and/or the second RI, a data transmission rate can be improved while QoS of data transmission is ensured.

For example, in NR, a period of sending a reference signal by a terminal device is usually long, a time length of a transmission time interval (Transmission Time Interval, TTI) of data may be configured, and the time length of the TTI is far less than a sending period of a measurement reference signal. Therefore, when the method in this embodiment of the present invention is used to improve a data transmission rate, obtained CSI is closer to an actual channel state change, so that rate control in a data transmission process is more accurate.

S903b. The terminal device decreases a second MCS and/or a second RI after receiving K2 pieces of negative acknowledgement information in K3 consecutive subframes.

K2>0, and K3>0. If the terminal device receives the K2 pieces of negative acknowledgement information in the K3 consecutive subframes, it may indicate that a small percentage of data transmitted by the terminal device is correct, in other words, a packet loss rate of a data packet is high. In this case, the terminal device may decrease the second MCS and/or the second RI.

Because the terminal device receives the K2 pieces of negative acknowledgement information in the K3 consecutive subframes, it indicates that a small percentage of data transmitted by the terminal device is correct, in other words, the packet loss rate of a data packet is high. In this case, when the terminal device decreases the second MCS and/or the second RI, QoS of data transmission can be ensured.

The foregoing mainly describes the solutions provided in the embodiments of the present invention from the perspective of the terminal device and the base station. It may be understood that, to implement the foregoing functions, the terminal device and the base station include corresponding hardware structures and/or software modules for performing the functions. A person skilled in the art should be easily aware that, the terminal device, the base station, and algorithm steps in the examples described with reference to the embodiments disclosed in this specification can be implemented by hardware or a combination of hardware and computer software in the present invention. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present invention.

In the embodiments of the present invention, the terminal device and the base station may be divided into functional modules or functional units based on the foregoing method examples. For example, each functional module or functional unit may be obtained through division based on each function, or two or more functions may be integrated into one processing module. The integrated module may be implemented in a form of hardware, or may be implemented in a form of a software functional module or functional unit. The module or unit division in the embodiments of the present invention is an example, and is merely logical function division. There may be other division manners in actual implementation.

Figure 11:
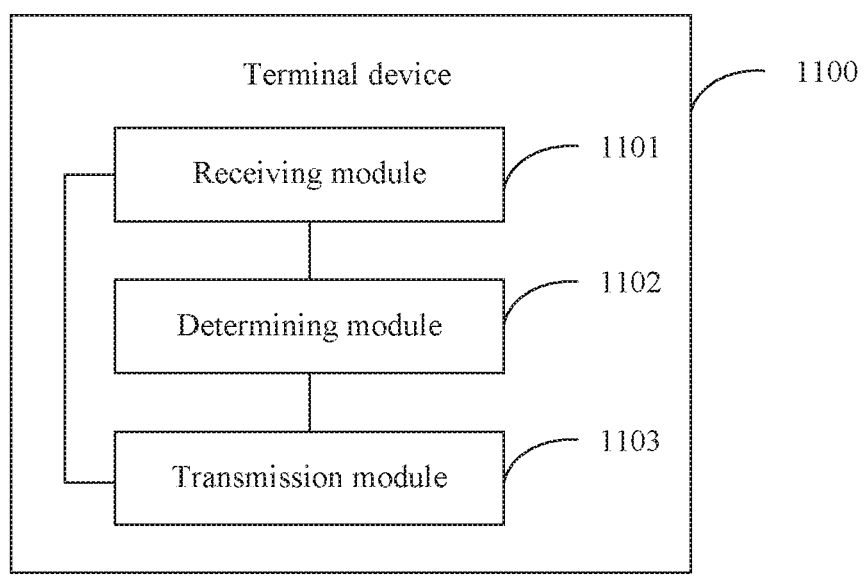
FIG. 11 is a schematic structural diagram 1 of a terminal device according to an embodiment of the present invention.

FIG. 11 is a possible schematic structural diagram of a terminal device in the foregoing embodiments. The terminal device 1100 may include a receiving module 1101, a determining module 1102, and a transmission module 1103.

The receiving module 1101 is configured to support S302, S304, S502, and S902 in the foregoing embodiments, and/or is used in another process of the technologies described in this specification. The determining module 1102 is configured to support S305, S306, S305a and S305b in the foregoing embodiments, and/or is used in another process of the technologies described in this specification. The transmission module 1103 is configured to support S307 in the foregoing embodiments, and/or is used in another process of the technologies described in this specification.

Figure 12:
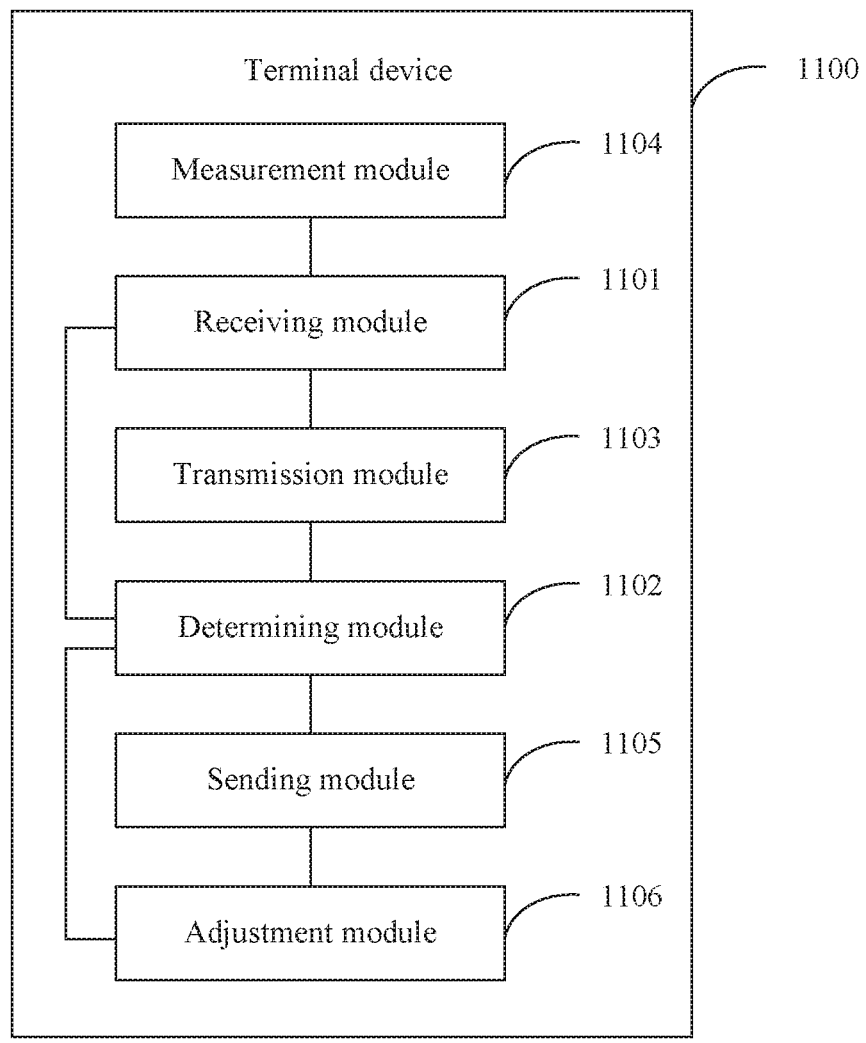
FIG. 12 is a schematic structural diagram 2 of a terminal device according to an embodiment of the present invention.

Further, as shown in FIG. 12, the terminal device 1100 shown in FIG. 11 may further include a measurement module 1104, a sending module 1105, and an adjustment module 1106. The measurement module 1104 is configured to support S701 in the foregoing embodiments, and/or is used in another process of the technologies described in this specification. The sending module 1105 is configured to support S308 and S801 in the foregoing embodiments, and/or is used in another process of the technologies described in this specification. The adjustment module 1106 is configured to support S903, S903a, and S903b in the foregoing embodiments, and/or is used in another process of the technologies described in this specification.

Certainly, the terminal device 1100 provided in this embodiment of the present invention includes but is not limited to the foregoing modules. For example, the terminal device 1100 may further include a storage module. The storage module may be configured to store the beam indication information and the scheduling information in the embodiments of the present invention.

When an integrated unit is used, the determining module 1102, the transmission module 1103, the measurement module 1104, the adjustment module 1106, and the like may be integrated into one processing module for implementation. The processing module may be a processor or a controller, for example, may be a CPU, a general-purpose processor, a digital signal processor (English: Digital Signal Processor, DSP for short), an application-specific integrated circuit (English: Application-Specific Integrated Circuit, ASIC for short), a field programmable gate array (English: Field Programmable Gate Array, FPGA for short) or another programmable logic device, a transistor logic device, a hardware component, or any combination thereof. The processing module may implement or execute various example logical blocks, modules, and circuits that are described with reference to the content disclosed in the present invention. The processing unit may alternatively be a combination of processors implementing a computing function, for example, a combination of one or more microprocessors or a combination of a DSP and a microprocessor. The receiving module 1101 and the sending module 1105 may be integrated into one communications module for implementation. The communications module may be a communications interface. The storage module may be a memory.

Figure 13:
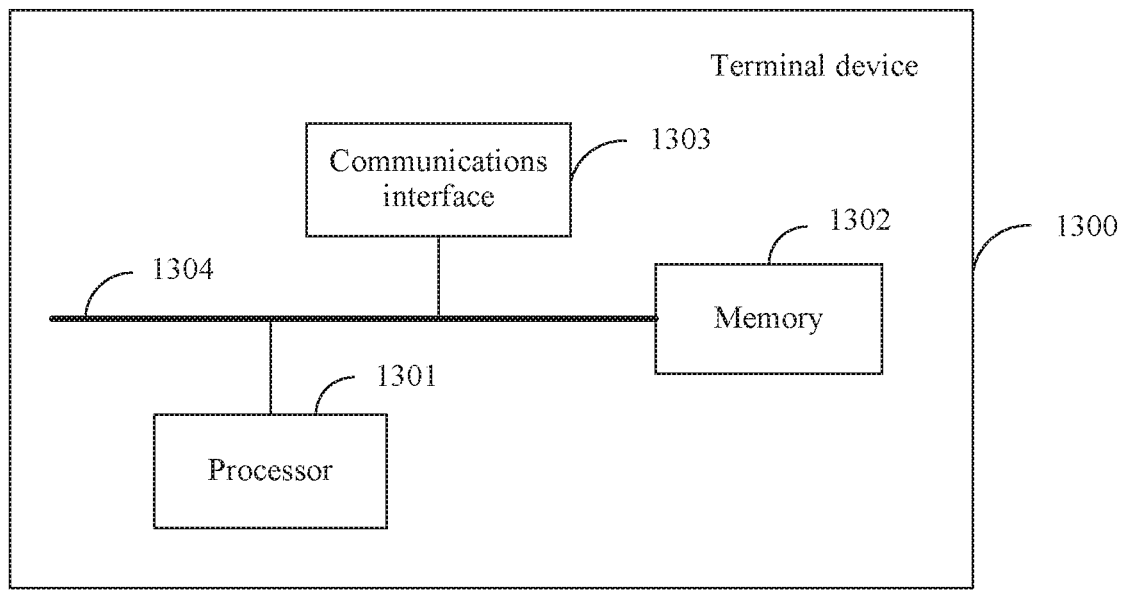
FIG. 13 is a schematic structural diagram 3 of a terminal device according to an embodiment of the present invention.

When the processing module is a processor, the storage module is a memory, and the communications module is a transceiver, the terminal device 1100 in this embodiment of the present invention may be a terminal device 1300 shown in FIG. 13. As shown in FIG. 13, the terminal device 1300 includes a processor 1301, a memory 1302, and a communications interface 1303. The processor 1301, the memory 1302, and the communications interface 1303 are interconnected by using a bus 1304.

The bus 1304 may be a peripheral component interconnect (English: Peripheral Component Interconnect, PCI for short) bus, an extended industry standard architecture (English: Extended Industry Standard Architecture, EISA for short) bus, or the like. The bus 1304 may be classified into an address bus, a data bus, a control bus, and the like. For ease of representation, only one thick line is used to represent the bus in FIG. 13, but this does not mean that there is only one bus or only one type of bus.

The terminal device 1300 may include one or more processors 1301. In other words, the terminal device 1300 may include a multi-core processor.

An embodiment of the present invention further provides a computer storage medium. The computer storage medium stores one or more pieces of program code. When the processor 1301 of the terminal device 1300 executes the program code, the terminal device 1300 performs a related method step in any accompanying drawing in FIG. 3, FIG. 5A, and FIG. 5B to FIG. 10A and FIG. 10B.

For detailed descriptions of the modules in the terminal device 1300 provided in this embodiment of the present invention and a technical effect brought after each module or unit performs a related method step in any accompanying drawing in FIG. 3, FIG. 5A, and FIG. 5B to FIG. 10A and FIG. 10B, refer to related descriptions in the method embodiments of the present invention. Details are not described herein again.

Figure 14:
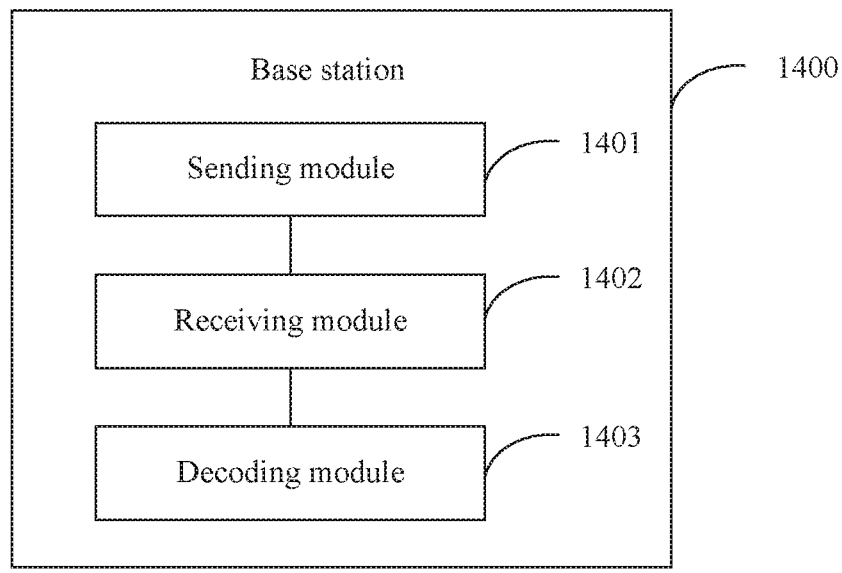
FIG. 14 is a schematic structural diagram 1 of a base station according to an embodiment of the present invention.

An embodiment of the present invention further provides a base station. FIG. 14 is a possible schematic structural diagram of the base station in the foregoing embodiments. The base station 1400 includes a sending module 1401, a receiving module 1402, and a decoding module 1403.

The sending module 1401 is configured to support S301, S303, S501, and S901 in the foregoing embodiments, and/or is used in another process of the technologies described in this specification. The receiving module 1402 is configured to support S309 and S802 in the foregoing embodiments, and/or is used in another process of the technologies described in this specification. The decoding module 1403 is configured to support S310 in the foregoing embodiments, and/or is used in another process of the technologies described in this specification.

Figure 15:
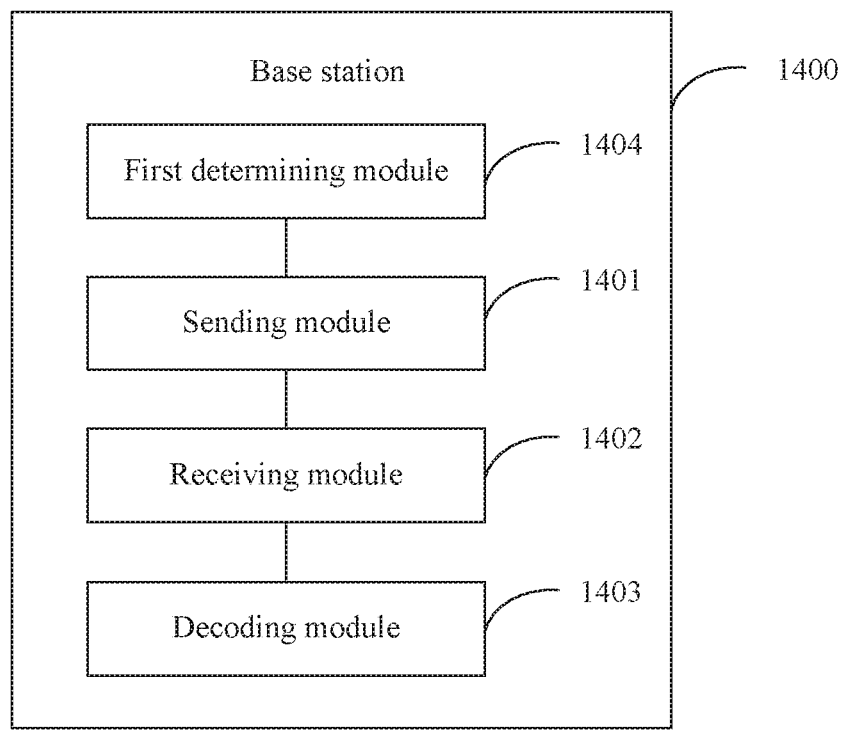
FIG. 15 is a schematic structural diagram 2 of a base station according to an embodiment of the present invention.

Further, as shown in FIG. 15, the base station 1400 shown in FIG. 14 may further include a first determining module 1404 or a second determining module.

The first determining module 1404 is configured to support S601 in the foregoing embodiments, and/or is used in another process of the technologies described in this specification. The second determining module is configured to support S803 in the foregoing embodiments, and/or is used in another process of the technologies described in this specification.

Certainly, the base station 1400 provided in this embodiment of the present invention includes but is not limited to the foregoing modules. For example, the base station 1400 may further include a storage module. The storage module may be configured to store the second modulation and coding indication information in the embodiments of the present invention.

When an integrated unit is used, the decoding module 1403, the first determining module 1404, the second determining module, and the like may be integrated into one processing module for implementation. The processing module may be a processor or a controller. For example, the processing module may be a CPU, a general-purpose processor, a DSP, an ASIC, an FPGA or another programmable logic device, a transistor logic device, a hardware component, or any combination thereof. The processing module may implement or execute various example logical blocks, modules, and circuits that are described with reference to the content disclosed in the present invention. The processing unit may alternatively be a combination of processors implementing a computing function, for example, a combination of one or more microprocessors or a combination of a DSP and a microprocessor. The sending module 1401 and the receiving module 1402 may be integrated into one communications module for implementation. The communications module may be a communications interface. The storage module may be a memory.

Figure 16:
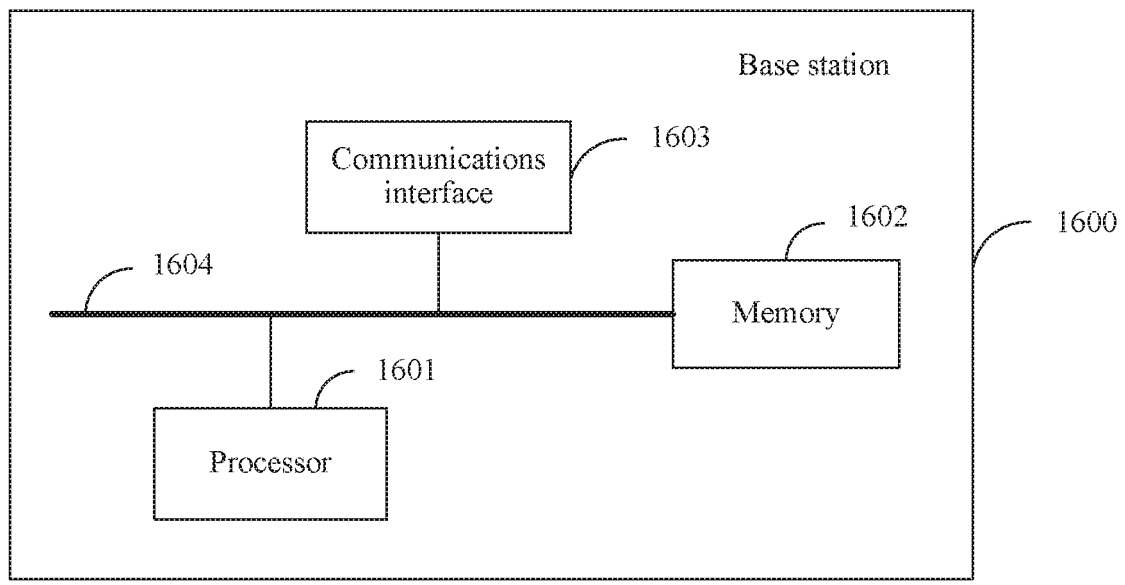
FIG. 16 is a schematic structural diagram 3 of a base station according to an embodiment of the present invention.

When the processing module is a processor, the storage module is a memory, and the communications module is a transceiver, the base station 1400 in this embodiment of the present invention may be a base station 1600 shown in FIG. 16. As shown in FIG. 16, the base station 1600 includes a processor 1601, a memory 1602, and a communications interface 1603. The processor 1601, the memory 1602, and the communications interface 1603 are interconnected by using a bus 1604.

The bus 1604 may be a PCI bus, an EISA bus, or the like. The bus 1604 may be classified into an address bus, a data bus, a control bus, and the like. For ease of representation, only one thick line is used to represent the bus in FIG. 16, but this does not mean that there is only one bus or only one type of bus.

The base station 1600 may include one or more processors 1601. In other words, the terminal device 1600 may include a multi-core processor.

An embodiment of the present invention further provides a computer storage medium. The computer storage medium stores one or more pieces of program code. When the processor 1601 of the base station 1600 executes the program code, the base station 1600 performs a related method step in any accompanying drawing in FIG. 3, FIG. 5A, and FIG. 5B to FIG. 10A and FIG. 10B.

For detailed descriptions of the modules in the base station 1600 provided in this embodiment of the present invention and a technical effect brought after each module or unit performs a related method step in any accompanying drawing in FIG. 3, FIG. 5A, and FIG. 5B to FIG. 10A and FIG. 10B, refer to related descriptions in the method embodiments of the present invention. Details are not described herein again.

The foregoing descriptions about implementations allow a person skilled in the art to understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different functional modules to implement all or some of the functions described above. For a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a flash memory, a removable hard disk, a read-only memory, a random access memory, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A data transmission rate control method implemented by a terminal device, wherein the data transmission rate control method comprises:
   receiving beam indication information from a base station, wherein the beam indication information comprises one or more candidate beam pair links (BPLs);
   receiving, from the base station, scheduling information that comprises resource indication information and first modulation and coding indication information, wherein the first modulation and coding indication information comprises a first modulation and coding scheme (MCS) or a first rank indication (RI);
   determining at least one beam based on the one or more candidate BPLs;
   determining second modulation and coding indication information according to the first modulation and coding indication information, wherein the second modulation and coding indication information comprises a second MCS or a second RI;
   transmitting data using the at least one beam according to the resource indication information and the second modulation and coding indication information;
   receiving acknowledgement information or negative acknowledgement information from the base station; and
   adjusting the second modulation and coding indication information based on the acknowledgement information or the negative acknowledgement information.

2. The data transmission rate control method of claim 1, wherein the one or more candidate BPLs comprises one or more terminal-side beams, wherein the data transmission rate control method further comprises receiving measurement indication information from the base station, wherein the measurement indication information comprises uplink measurement results of the one or more terminal-side beams, and wherein determining the at least one beam comprises determining the at least one beam from the one or more terminal-side beams based on the uplink measurement results.

3. The data transmission rate control method of claim 1, wherein the one or more candidate BPLs comprises one or more base station-side beams, wherein the data transmission rate control method further comprises measuring the one or more base station-side beams to obtain downlink measurement results of the one or more base station-side beams, and wherein determining the at least one beam comprises determining the at least one beam from the one or more base station-side beams based on the downlink measurement results.

4. The data transmission rate control method of claim 1, wherein after transmitting the data using the at least one beam, the data transmission rate control method further comprises sending the second modulation and coding indication information to the base station to enable the base station to decode the data according to the second modulation and coding indication information.

5. The data transmission rate control method of claim 1, wherein adjusting the second modulation and coding indication information comprises increasing the second MCS or the second RI after receiving one or more pieces of acknowledgement information.

6. The data transmission rate control method of claim 1, wherein adjusting the second modulation and coding indication information comprises decreasing the second MCS or the second RI after receiving one or more pieces of negative acknowledgement information in one or more subframes.

7. The data transmission rate control method of claim 1, wherein adjusting the second modulation and coding indication information comprises decreasing the second MCS after receiving one or more pieces of negative acknowledgement information in one or more subframes.

8. The data transmission rate control method of claim 1, wherein adjusting the second modulation and coding indication information comprises decreasing the second RI after receiving one or more pieces of negative acknowledgement information in one or more subframes.

9. A data transmission rate control method, wherein the data transmission rate control method is implemented by a base station, and wherein the data transmission rate control method comprises:
   sending beam indication information to a terminal device, wherein the beam indication information comprises one or more candidate beam pair links (BPLs);
   sending scheduling information to the terminal device, wherein the scheduling information comprises resource indication information and first modulation and coding indication information, and wherein the first modulation and coding indication information comprises a first modulation and coding scheme (MCS) or a first rank indication (RI);
   receiving second modulation and coding indication information from the terminal device, wherein the second modulation and coding indication information is based on the first modulation and coding indication information, and wherein the second modulation and coding indication information comprises a second MCS or a second RI;
   decoding data according to the second modulation and coding indication information; and
   sending acknowledgement information or negative acknowledgement information to the terminal device to enable the terminal device to adjust the second modulation and coding indication information based on the acknowledgement information or the negative acknowledgement information.

10. The data transmission rate control method of claim 9, wherein the one or more candidate BPLs comprises one or more terminal-side beams, wherein the data transmission rate control method further comprises sending measurement indication information to the terminal device, and wherein the measurement indication information comprises uplink measurement results of the one or more terminal-side beams.

11. The data transmission rate control method of claim 10, further comprising determining the first modulation and coding indication information based on the uplink measurement results.

12. The data transmission rate control method of claim 9, wherein the one or more candidate BPLs comprises one or more base station-side beams.

13. The data transmission rate control method of claim 12, further comprising:
receiving, from the terminal device, downlink measurement results of the one or more base station-side beams; and
determining the first modulation and coding indication information based on the downlink measurement results.

14. A terminal device, comprising:
a memory configured to store a computer-executable instruction; and
a processor coupled to the memory and configured to execute the computer-executable instruction to cause the terminal device to:
receive, from a base station, beam indication information comprising one or more candidate beam pair links (BPLs);
receive scheduling information from the base station, wherein the scheduling information comprises resource indication information and first modulation and coding indication information, and wherein the first modulation and coding indication information comprises a first modulation and coding scheme (MCS) or a first rank indication (RI);
determine at least one beam based on the one or more candidate BPLs;
determine second modulation and coding indication information according to the first modulation and coding indication information, wherein the second modulation and coding indication information comprises a second MCS or a second RI;
transmit data using the at least one beam according to the resource indication information and the second modulation and coding indication information;
receive acknowledgement information or negative acknowledgement information from the base station; and
adjust the second modulation and coding indication information based on the acknowledgement information or the negative acknowledgement information.

15. The terminal device of claim 14, wherein the one or more candidate BPLs comprises one or more terminal-side beams, and wherein the processor is further configured to execute the computer-executable instruction to cause the terminal device to:
receive measurement indication information from the base station, wherein the measurement indication information comprises uplink measurement results of the one or more terminal-side beams; and
determine the at least one beam from the one or more terminal-side beams based on the uplink measurement results.

16. The terminal device of claim 14, wherein the one or more candidate BPLs comprises one or more base station-side beams, and wherein the processor is further configured to execute the computer-executable instruction to cause the terminal device to:
measure the one or more base station-side beams to obtain downlink measurement results of the one or more base station-side beams; and
determine the at least one beam from the one or more base station-side beams based on the downlink measurement results.

17. The terminal device of claim 14, wherein the processor is further configured to execute the computer-executable instruction to cause the terminal device to send the second modulation and coding indication information to the base station after transmitting the data on the at least one beam to enable the base station to decode the data according to the second modulation and coding indication information.

18. The terminal device of claim 14, wherein the processor is further configured to execute the computer-executable instruction to cause the terminal device to increase the second MCS or the second RI after receiving one or more pieces of acknowledgement information.

19. The terminal device of claim 14, wherein the processor is further configured to execute the computer-executable instruction to cause the terminal device to decrease the second MCS or the second RI after receiving one or more pieces of negative acknowledgement information in one or more subframes.

20. The terminal device of claim 14, wherein the processor is further configured to execute the computer-executable instruction to cause the terminal device to increase the second MCS after receiving one or more pieces of acknowledgement information.

* * * * *

UNITED STATES PATENT AND TRADEMARK OFFICE
CERTIFICATE OF CORRECTION

| | | |
|---|---|---|
| PATENT NO. | : 10,945,151 B2 | Page 1 of 1 |
| APPLICATION NO. | : 16/464050 | |
| DATED | : March 9, 2021 | |
| INVENTOR(S) | : Yanliang Sun, Bin Liu and Kai Xu | |

It is certified that error appears in the above-identified patent and that said Letters Patent is hereby corrected as shown below:

On the Title Page

(22) PCT Filed: "April 26, 2017" should read "April 27, 2017"

Signed and Sealed this
Eleventh Day of May, 2021

Drew Hirshfeld
*Performing the Functions and Duties of the*
*Under Secretary of Commerce for Intellectual Property and*
*Director of the United States Patent and Trademark Office*